(12) United States Patent
Lee et al.

(10) Patent No.: US 11,670,087 B2
(45) Date of Patent: Jun. 6, 2023

(54) TRAINING DATA GENERATING METHOD FOR IMAGE PROCESSING, IMAGE PROCESSING METHOD, AND DEVICES THEREOF

(71) Applicant: SAMSUNG ELECTRONICS CO., LTD., Suwon-si (KR)

(72) Inventors: Won-ju Lee, Suwon-si (KR); Se-ho Shin, Suwon-si (KR); Dong-wook Lee, Hwaseong-si (KR); Dae-hyun Ji, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 53 days.

(21) Appl. No.: 16/514,661

(22) Filed: Jul. 17, 2019

(65) Prior Publication Data
US 2020/0082182 A1      Mar. 12, 2020

(30) Foreign Application Priority Data

Sep. 12, 2018   (KR) .......................... 10-2018-0109024

(51) Int. Cl.
*G06V 20/56*     (2022.01)
*G06T 7/536*    (2017.01)
(Continued)

(52) U.S. Cl.
CPC .......... *G06V 20/56* (2022.01); *G06F 18/2148* (2023.01); *G06N 3/045* (2023.01);
(Continued)

(58) Field of Classification Search
CPC ........... G06K 9/00805; G06K 9/00825; G06K 9/00704; G06K 9/6257; G06K 9/4628; G06K 9/6201; G06K 9/6256; G06K 9/627; G06K 9/00791; G06N 3/0454; G06N 3/08; G06T 7/536; G06T 2207/10004; G06T 7/70; G06T 2207/20081;
(Continued)

(56) References Cited

U.S. PATENT DOCUMENTS

| 5,604,529 A | 2/1997 | Kuga et al. |
| 9,070,202 B2 | 6/2015 | Chandraker et al. |

(Continued)

FOREIGN PATENT DOCUMENTS

| JP | 6203166 B2 | 9/2017 |
| KR | 10-0257335 B1 | 5/2000 |

(Continued)

OTHER PUBLICATIONS

Jjang Yoeun Min et al. (English Translation of KR101689252B2 as attached) (Year: 2015).*

(Continued)

*Primary Examiner* — Farhan Mahmud
(74) *Attorney, Agent, or Firm* — Sughrue Mion, PLLC

(57) ABSTRACT

An image processing method and an image processing device detect an object from a driving image of a vehicle, obtain information on an altitude difference between the vehicle and the object, and input image domain coordinates of the object in the driving image and the information on the altitude difference to a neural network and determine world domain coordinates of the object.

18 Claims, 17 Drawing Sheets

(51) Int. Cl.
  *G06V 20/00* (2022.01)
  *G06V 20/58* (2022.01)
  *G06F 18/214* (2023.01)
  *G06N 3/045* (2023.01)
  *G06V 10/75* (2022.01)
  *G06V 10/764* (2022.01)
  *G06V 10/774* (2022.01)
  *G06V 10/44* (2022.01)

(52) U.S. Cl.
  CPC ............ *G06T 7/536* (2017.01); *G06V 10/454* (2022.01); *G06V 10/75* (2022.01); *G06V 10/764* (2022.01); *G06V 10/774* (2022.01); *G06V 20/39* (2022.01); *G06V 20/584* (2022.01); *G06T 2207/10004* (2013.01); *G06V 20/58* (2022.01)

(58) Field of Classification Search
  CPC . G06T 2207/30252; G06T 2207/30261; G06T 2207/10016; G06T 2207/30256; G06T 19/006; G06T 2207/10028; G06T 7/73; G06T 7/74; G06T 17/05; G01S 19/42; G06V 20/58; G06V 20/588; G06V 20/56; G05D 2201/0213; G05D 1/0088; G05D 1/0246; G08G 1/166; G08G 1/167; B60W 2420/42; G01C 21/32
  See application file for complete search history.

(56) References Cited

U.S. PATENT DOCUMENTS

| | | |
|---|---|---|
| 2001/0055032 A1 | 12/2001 | Saito et al. |
| 2004/0264763 A1* | 12/2004 | Mas ................. G06K 9/00664 382/154 |
| 2005/0174346 A1 | 8/2005 | Park et al. |
| 2006/0233436 A1* | 10/2006 | Ma .......................... G06T 7/50 382/154 |
| 2010/0001991 A1 | 1/2010 | Jeong et al. |
| 2010/0183192 A1* | 7/2010 | Fritsch .................. G06T 7/254 382/103 |
| 2010/0321489 A1* | 12/2010 | Chen ........................ G01S 5/16 348/116 |
| 2016/0014406 A1* | 1/2016 | Takahashi ................. G06T 7/50 382/154 |
| 2016/0019429 A1* | 1/2016 | Ishigaki ............... G01B 11/026 348/47 |
| 2017/0098129 A1 | 4/2017 | Lo et al. |
| 2017/0371348 A1 | 12/2017 | Mou |
| 2018/0005050 A1 | 1/2018 | Browning et al. |
| 2018/0157925 A1 | 6/2018 | Zeviar et al. |
| 2019/0303725 A1* | 10/2019 | Gurvich ............... G01B 11/026 348/47 |
| 2019/0384303 A1* | 12/2019 | Muller ............... G06K 9/00791 |

FOREIGN PATENT DOCUMENTS

| | | |
|---|---|---|
| KR | 10-1154018 B1 | 6/2012 |
| KR | 10-2015-0051388 A | 5/2015 |
| KR | 10-1544021 B1 | 8/2015 |
| KR | 10-1689252 B1 | 12/2016 |
| KR | 10-1839455 B1 | 3/2018 |
| WO | 2018/052714 A2 | 3/2018 |

OTHER PUBLICATIONS

Sumitomo (English Translation WO2010113240A1) (Year: 2009).*
"NES Game: F-1 Race (1984 Nintendo)" YouTube video posted on Jul. 6, 2016. Frame taken at 17:10/27:23. [online]. [retrieved on Mar. 24, 2022]. Retrieved from the Internet: <URL:https://www.youtube.com/watch?v=RvfQU3Ewtso> (Year: 1984).*
Communication dated May 12, 2020 issued by the European Intellectual Property Office in counterpart European Application No. 19196552.4.
Communication dated Jan. 7, 2020 issued by the European Intellectual Property Office in counterpart European Application No. 19196552.4.
Bas et al., "An Easy to Install Camera Calibration for Traffic Monitoring", Nov. 9, 1997, pp. 362-366, 5 pages total, XP010270935.
Wang et al., "Driver Assistance System for Lane Detection and Vehicle Recognition with Night Vision", Aug. 2, 2005, 6 pages total, XP010857578.

* cited by examiner

FIG. 1
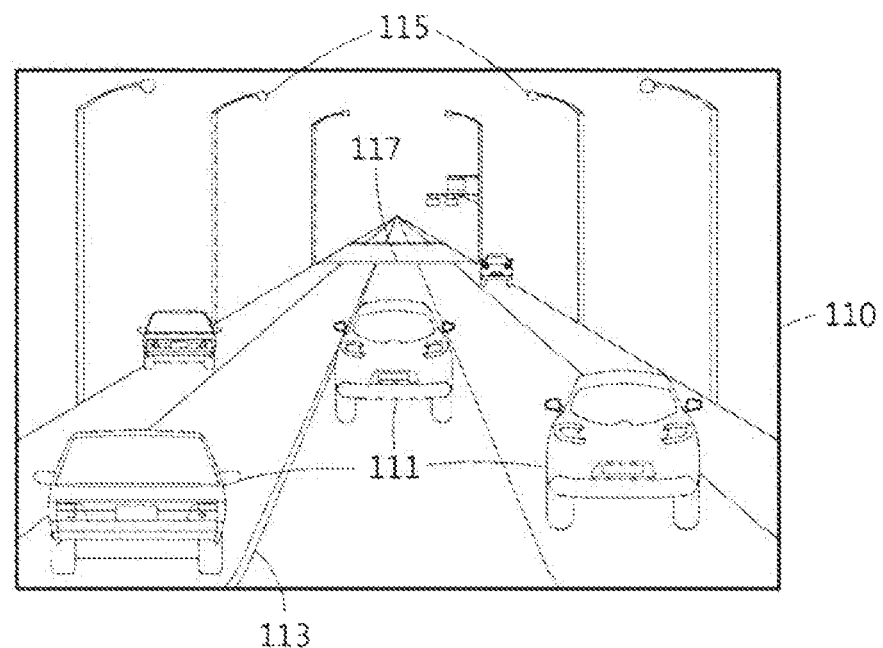
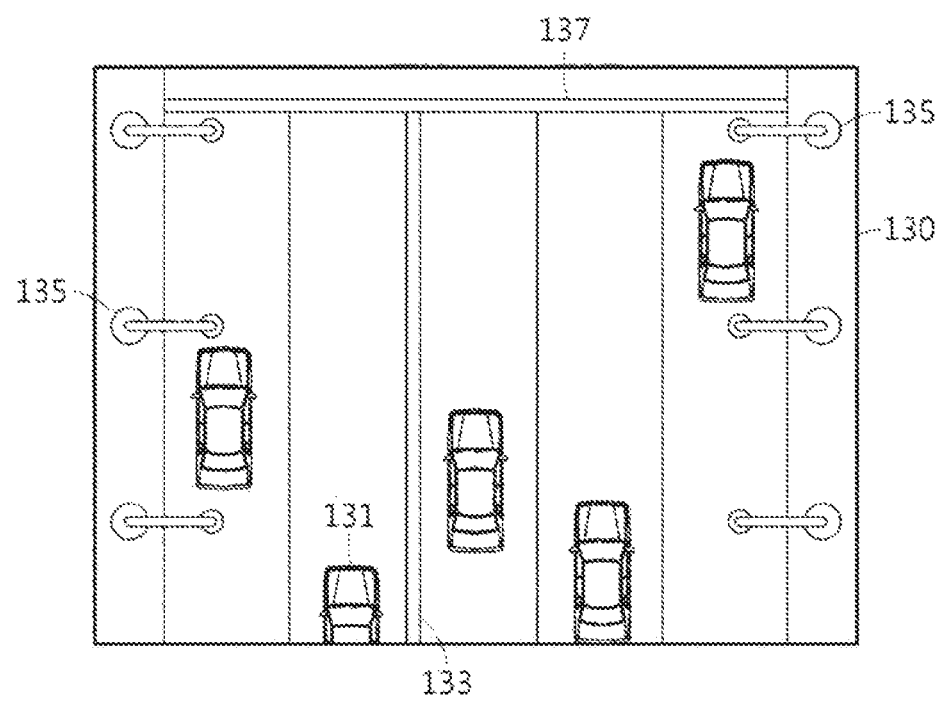

| | CAMERA | Radar/Lidar | TRAINING DATA |
|---|---|---|---|
| t=n (WITHIN MATCHING DISTANCE) | $(i_{x_0}, i_{y_0})$ ↓ $(w_{x_0}, w_{y_0})$ ⟷ ID : a = | $(w^*_{x_0}, w^*_{y_0})$ ID : b | $(i_{x_0}, i_{y_0}, w^*_{x_0}, w^*_{y_0})$ |
| t=n+1 (GREATER THAN MATCHING DISTANCE) | $(i_{x_1}, i_{y_1})$ ↓ $(w_{x_1}, w_{y_1})$ ID : a | $(w^*_{x_1}, w^*_{y_1})$ ID : b | $(i_{x_1}, i_{y_1}, w^*_{x_1}, w^*_{y_1})$ |
| t=n+2 (GREATER THAN MATCHING DISTANCE) | $(i_{x_2}, i_{y_2})$ ↓ $(w_{x_2}, w_{y_2})$ ID : a | $(w^*_{x_2}, w^*_{y_2})$ ID : b | $(i_{x_2}, i_{y_2}, w^*_{x_2}, w^*_{y_2})$ |
| ⋮ | ⋮ | ⋮ | ⋮ |

FIG. 13

| NUMBER OF REPETITIONS | CONVERSION | Matching distance | OUTPUT |
|---|---|---|---|
| itr 0 | HOMOGRAPHY | 10m | TRAINING DATA 0 |
| itr 1 | N.N 0 | 15m | TRAINING DATA 1 |
| itr 2 | N.N 1 | 20m | TRAINING DATA 2 |
| ⋮ | ⋮ | ⋮ | ⋮ |

TRAINING DATA GENERATING METHOD FOR IMAGE PROCESSING, IMAGE PROCESSING METHOD, AND DEVICES THEREOF

CROSS-REFERENCE TO RELATED APPLICATION

This application claims priority from Korean Patent Application No. 10-2018-0109024, filed on Sep. 12, 2018, in the Korean Intellectual Property Office, the disclosure of which is herein incorporated by reference in its entirety.

BACKGROUND

Embodiments of the disclosure relate to a training data generating method for image processing, an image processing method, and devices thereof.

Recognition and detection of objects for automatic driving may be performed through a driving image of a vehicle. At this time, a non-linear transition by a homography operation may be used for rebuilding two-dimensional (2D) image domain coordinates to three-dimensional (3D) world domain coordinates.

However, the transition of the 2D image domain coordinates into the 3D world domain coordinates by the homography operation may be incorrect and a large error may occur when a lane and an object are detected and a position of a vehicle is estimated. Such an error causes instability when the vehicle is driven. In particular, correctness may remarkably deteriorate in a lamp section in which an altitude of a road varies.

SUMMARY

According to an aspect of an embodiment of the disclosure, there is provided an image processing method including detecting an object within a driving image, obtaining an altitude difference between the vehicle and the object, determining world domain coordinates of the object by a neural network processing of image domain coordinates of the object in the driving image and the altitude difference, and controlling the vehicle on the road with respect to the object based on the world domain coordinates of the object.

The altitude difference may include pitch information of the vehicle and vanishing line information in the driving image.

The image processing method may further include tracking the image domain coordinates of the object with the lapse of time and filtering the tracked image domain coordinates of the object and converting a type of the image domain coordinates of the object into a floating point.

The image processing method may further include performing scaling normalization on the image domain coordinates of the object in the driving image based on the vanishing line information in the driving image.

The object includes a dynamic object with mobility and a still object without mobility and the neural network may include at least one of a first neural network for estimating world domain coordinates of the dynamic object and a second neural network for estimating world domain coordinates of the still object.

When the object is the dynamic object with mobility, the image processing method may further include generating a live map corresponding to the dynamic object by using a result of converting image domain coordinates of the dynamic object into the world domain coordinates and generating a driving parameter of the vehicle for controlling the vehicle on the road with respect to the dynamic object by using the live map.

When the object is the still object without mobility, the image processing method may further include generating a landmark map corresponding to the still object by using a result of converting image domain coordinates of the still object into the world domain coordinates and determining at least one of a position and a route of the vehicle for controlling the vehicle on the road with respect to the still object by using the landmark map.

The image processing method may further include outputting world domain coordinates of the object.

The image processing method may further include obtaining the driving image captured by a camera mounted in the vehicle.

According to an aspect of an embodiment of the disclosure, there is provided a training data generating method including obtaining image domain coordinates of dynamic objects by tracking the dynamic objects within a driving image, converting image domain coordinates of a first dynamic object among the dynamic objects into first world domain coordinates of the first dynamic object, wherein the first dynamic object is positioned within a predetermined matching distance from a vehicle, obtaining second world domain coordinates of peripheral objects by tracking the peripheral objects by using a distance sensor, matching one of the peripheral objects with the first dynamic object by comparing the first world domain coordinates with the second world domain coordinates, and generating training data including the image domain coordinates of the first dynamic object and the second world domain coordinates of the matched peripheral object.

The converting of the image domain coordinates of the first dynamic object into the first world domain coordinates may include converting initial image domain coordinates of the first dynamic object into the first world domain coordinates by a homography operation.

The training data generating method further includes associating a first identifier (ID) with the first dynamic object and associating second IDs with the peripheral objects. The matching of one of the peripheral objects with the first dynamic object may include matching a second ID among the second IDs associated with one of the peripheral objects with the first ID associated with the first dynamic object.

The dynamic objects may include at least one of peripheral vehicles, pedestrians, and animals.

The training data generating method may further include tracking the image domain coordinates of the dynamic objects over lapse of time and converting a type of the image domain coordinates of the dynamic objects into a floating point by filtering the tracked image domain coordinates of the dynamic objects.

The training data generating method may further include performing scaling normalization on the image domain coordinates of the dynamic objects in the driving image based on vanishing line information in the driving image.

According to an aspect of an embodiment of the disclosure, there is provided a training data generating method including storing image domain coordinates of a still object by tracking the still object from a driving image including a plurality of frames over lapse of time, converting image domain coordinates of a current frame among the image domain coordinates into first global world domain coordinates based on global positioning system (GPS) information, obtaining second global world domain coordinates of peripheral objects based on an output of a distance sensor and the GPS information, matching one of the peripheral objects with the still object by comparing the first global world domain coordinates with the second global world domain coordinates, and generating a plurality of training data, each training data of the plurality of training data includes one of the stored image domain coordinates and second global world domain coordinates of the matched peripheral object.

The training data generating method further includes providing a first ID to the still object and providing second IDs to the peripheral objects. The matching one of the peripheral objects with the still object may include matching a second ID provided to one of the peripheral objects with the first ID provided to the still object.

The still object may include at least one of buildings, signs, traffic lights, a crosswalk, a stop line, and a driving line included in the driving image.

The training data generating method may further include tracking the image domain coordinates of the still object over lapse of time and converting a type of the image domain coordinates of the still object into a floating point by filtering the tracked image domain coordinates of the still object.

The training data generating method may further include performing scaling normalization on the image domain coordinates of the still object in the driving image based on vanishing line information in the driving image.

The training data generating method of claim may further include accumulatively storing the output of the distance sensor and the GPS information.

According to an aspect of an embodiment of the disclosure, there is provided an image processing device including a processor for detecting an object within a driving image, obtaining an altitude difference between the vehicle and the object, determining world domain coordinates of the object by a neural network processing of image domain coordinates of the object in the driving image and the altitude difference, and controlling the vehicle on the road with respect to the object based on the world domain coordinates of the object.

The altitude difference may include pitch information of the vehicle and vanishing line information in the driving image.

The processor tracks the image domain coordinates of the object with the lapse of time and filters the tracked image domain coordinates of the object to convert a type of the image domain coordinates of the object into a floating point.

The processor may perform scaling normalization on the image domain coordinates of the object in the driving image based on vanishing line information in the driving image.

The object may include a dynamic object with mobility and a still object without mobility and the neural network may include at least one of a first neural network for estimating world domain coordinates of the dynamic object and a second neural network for estimating world domain coordinates of the still object.

When the object is the dynamic object with mobility, the processor generates a live map corresponding to the dynamic object by using a result of converting image domain coordinates of the dynamic object into the world domain coordinates and may generate a driving parameter of the vehicle for controlling the vehicle on the road with respect to the dynamic object by using the live map.

When the object is the still object without mobility, the processor generates a landmark map corresponding to the still object by using a result of converting image domain coordinates of the still object into the world domain coordinates and may determine at least one of a position and a route of the vehicle for controlling the vehicle on the road with respect to the still object by using the landmark map.

The processor may output world domain coordinates of the object to correspond to the object.

The image processing device may further include a camera mounted in the vehicle to capture the driving image.

According to an aspect of an embodiment of the disclosure, there is provided a training data generating device including a processor for obtaining image domain coordinates of dynamic objects by tacking the dynamic objects within a driving image, converting image domain coordinates of a first dynamic object positioned within a predetermined matching distance from a vehicle, from among the dynamic objects into first world domain coordinates of the first dynamic object, obtaining second world domain coordinates of peripheral objects by tracking the peripheral objects by using a distance sensor, matching one of the peripheral objects with the first dynamic object by comparing the first world domain coordinates with the second world domain coordinates, and generating training data including the image domain coordinates of the first dynamic object and second world domain coordinates of the matched peripheral object.

According to an aspect of an embodiment of the disclosure, there is provided a training data generating device including a processor for storing image domain coordinates of a still object by tracking the still object from a driving image including a plurality of frames over lapse of time, converting image domain coordinates of a current frame among the image domain coordinates into first global world domain coordinates based on global positioning system (GPS) information, obtaining second global world domain coordinates of peripheral objects based on an output of a distance sensor and the GPS information, matching one of the peripheral objects with the still object by comparing the first global world domain coordinates with the second global world domain coordinates, and generating a plurality of training data, each training data of the plurality of training data includes one of the stored image domain coordinates and second global world domain coordinates of the matched peripheral object.

BRIEF DESCRIPTION OF THE DRAWINGS

Embodiments of the disclosure will be more clearly understood from the following detailed description taken in conjunction with the accompanying drawings in which:

FIG. 1 is a view illustrating a method of reconstructing two-dimensional (2D) image domain coordinates of a driving image to three-dimensional (3D) world domain coordinates, according to an embodiment of the disclosure;

FIG. 13 is a view illustrating a method of accumulatively generating training data, according to an embodiment of the disclosure;

DETAILED DESCRIPTION OF THE EMBODIMENTS

Figure 2:
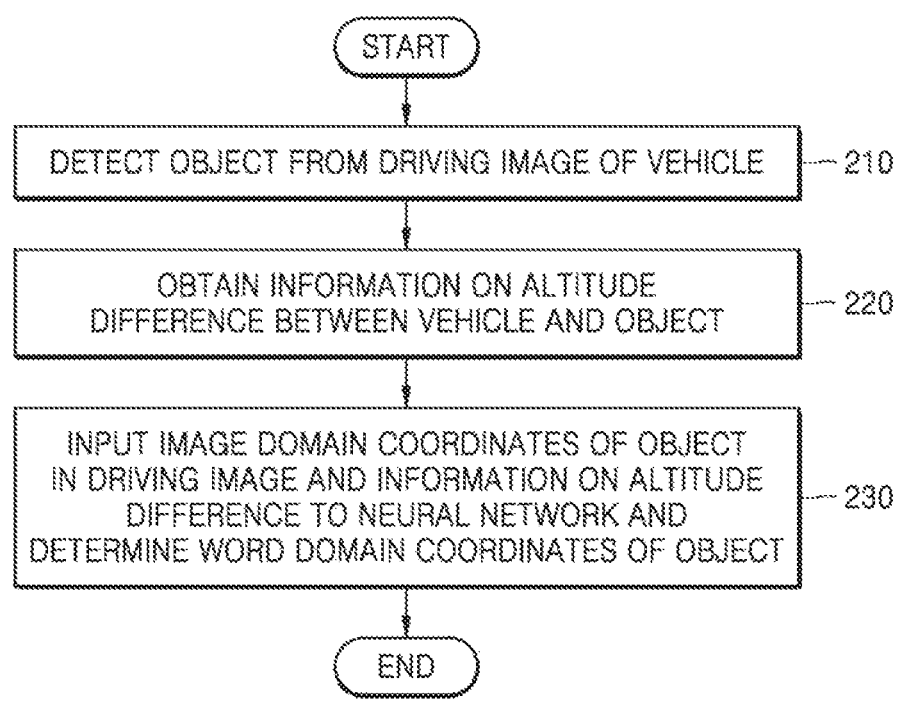
FIG. 2 is a flowchart illustrating an image processing method according to an embodiment of the disclosure.

Specific structural or functional descriptions disclosed in the current specification are provided in order to describe embodiments in accordance with a descriptive concept. The subject matter of the disclosure may be embodied in many different forms and should not be construed as being limited to the embodiments set forth herein.

While such terms as "first," "second," etc., may be used to describe various components, such components are not limited to the above terms. The above terms are used only to distinguish one component from another. For example, a first component may indicate a second component or a second component may indicate a first component without conflicting.

When a certain component is referred to as being "connected" to another component, the component may be directly connected to the other component. However, it may be understood that a different component may intervene.

Singular expressions, unless defined otherwise in contexts, include plural expressions. The terms "comprises" or "may comprise" used herein in various example embodiments may indicate the presence of a corresponding function, operation, or component and do not limit one or more additional functions, operations, or components. It will be further understood that the terms "comprises" and/or "comprising," when used in this specification, may be used to specify the presence of stated features, integers, steps, operations, elements, and/or components, but do not preclude the presence or addition of one or more other features, integers, steps, operations, elements, components, and/or groups thereof.

When a certain embodiment may be implemented differently, a specific process order may be performed differently from the described order. For example, two consecutively described processes may be performed substantially at the same time or performed in an order opposite to the described order. Variations from the shapes of the illustrations as a result, for example, of manufacturing techniques and/or tolerances, are to be expected. Thus, embodiments of the disclosure should not be construed as limited to the particular shapes of regions illustrated herein, but are to include deviations in shapes that result, for example, from manufacturing.

The embodiments to be described hereinafter may be used for displaying a lane in an augmented reality navigation system such as a smart vehicle or generating visual information for helping to steer an autonomous vehicle. In addition, the embodiments may be used for interpreting visual information and helping stable and comfortable driving in a device including an intelligence system such as a head up display (HUD) provided for driving assistance or complete autonomous driving in a vehicle. The embodiments may be used for an autonomous vehicle, a smart vehicle, a smart phone, and a mobile device. Hereinafter, the embodiments will be described in detail with reference to the accompanying drawings. The same reference numeral denotes the same member.

Hereinafter, 'a road' may be an expressway, a national highway, a local road, or a national expressway on which vehicles are driven. The road may include one or a plurality of lanes. 'A driving lane' may correspond to a lane used by a driving vehicle among a plurality of lanes. 'Lanes' may be distinguished from each other by lane marking displayed on a road surface. A lane may be defined by lane marking on the right and left of the road. 'The road marking' on the road surface on which the vehicle is driven may include lane marking such as a centerline or a taxiway line, a symbol such as a lane change line, a no left-turn, a progress direction guide line, or a crosswalk, or non-lane marking such as characters such as a children protection zone or slow down.

FIG. 1 is a view illustrating a method of reconstructing two-dimensional (2D) image domain coordinates of a driving image to three-dimensional (3D) world domain coordinates according to an embodiment of the disclosure.

Referring to FIG. 1, a 2D driving image 110 of a vehicle and a 3D image 130 corresponding to the 2D driving image 110 are illustrated. The 3D image 130 may be a top view image on world domain and may include depth information.

A detection system of the vehicle detects vehicles, people, traffic lights, signs, lanes, and road conditions. The vehicle avoids collision by detecting peripheral vehicles, driving crossroads, and road markings including the lanes, and may perform route search and perpendicular and horizontal direction control by identifying and/or detecting the signs and the traffic lights. Hereinafter, 'the vehicle' may include an automatic driving function and/or an advanced driver assistance (ADA) function.

The 2D driving image 110 may be captured by a capturing device during road driving. The capturing device may be mounted in the front of the vehicle, the side of the vehicle, the top of the vehicle, the bottom of the vehicle, the rear of the vehicle, or any one or combination of all of the above. The 2D driving image 110 may include various peripheral objects such as peripheral vehicles 111, a lane 113, street lamps 115, and a crosswalk 117.

An image processing device according to an embodiment may convert image domain coordinates of peripheral objects detected by analyzing the 2D driving image 110 to 3D world domain coordinates. The image processing device may employ a neural network to convert the image domain coordinates of peripheral objects detected by analyzing the 2D driving image 110 to 3D world domain coordinates. Peripheral vehicles 131, a lane 133, street lamps 135, and a crosswalk 137 may be displayed in the 3D image 130, similar to the indication thereof in the 2D driving image 110.

The image processing device may control a vehicle to drive while maintaining an inter-vehicle distance by correlating dynamic objects detected from an image domain of the 2D driving image 110 into a 3D world domain. In addition, the image processing device may control the vehicle to drive while maintaining a lane and to generate a route by transiting still objects detected from a 2D image domain to the 3D world domain, and estimating a position of the vehicle.

In addition, the image processing device according to an embodiment may reduce the load of the neural network by tracking and detecting partial objects (for example, vehicles, a road, signs, etc.) as targets without processing the 2D driving image 110.

Hereinafter, for convenience sake, 'the 2D image domain (coordinates)' will be simply represented as 'image domain (coordinates)' and 'the 3D world domain (coordinates)' will be simply represented as 'world domain (coordinates).'

FIG. 2 is a flowchart illustrating an image processing method according to an embodiment of an embodiment of the disclosure.

Referring to FIG. 2, an image processing device according to an embodiment detects objects from a driving image of a vehicle in operation S210. The driving image may be obtained by the capturing device mounted in the vehicle during the driving of the vehicle to capture a front view, side views, and other views from the perspective of the vehicle. Alternatively, the driving image may be at least one external image among the front view and the side views of the vehicle, which are received from an external source, such as a traffic camera, through a communication interface (refer to a communication interface 1770 of FIG. 17).

The driving image may include a road image including peripheral vehicles, a lane, a curb, a sidewalk, and a peripheral environment and/or a road surface image like the 2D driving image 110 illustrated in FIG. 1. The driving image may include various images such as an infrared image, a depth image, and a stereo image other than a color image. The driving image may include a frame, a plurality of frames, or a video.

Objects detected by the image processing device may be other vehicles, a road vanishing point, a road marking, pedestrians, vehicles, traffic lights, signs, people, animals, plants, and buildings. However, an embodiment of the disclosure is not limited thereto. The objects may include dynamic objects with mobility and/or still objects without mobility. The dynamic objects may include various objects with mobility such as peripheral vehicles, pedestrians, and animals. The still objects may include various objects without mobility such as various lanes such as a crosswalk, a stop line, and a driving line, a road marking, a road curb, buildings, signs, plants (trees), lights, and traffic lights.

In operation S210, the image processing device according to an embodiment may detect the objects from the driving image by using a convolution neural network (CNN) previously trained to recognize the objects. In the CNN, for example, a bounding box of lane display and non-lane display to be detected from the driving image and kinds of the lane display and the non-lane display to be detected from the driving image may be previously trained.

The image processing device obtains information on an altitude difference between a vehicle and an object in operation S220. The information on the altitude difference may include, for example, information on a pitch of the vehicle, and information on a vanishing line in the driving image. The information on the altitude difference between the vehicle and the object will be described in detail with reference to FIG. 3.

The image processing device inputs image domain coordinates of the object in the driving image and the information on the altitude difference to the neural network and determines world domain coordinates of the object in operation S230. The neural network may determine the world domain coordinates of the objects including both the dynamic objects and the still objects. Alternatively, the neural network may include at least one of a first neural network for determining the world domain coordinates of the dynamic objects and a second neural network for determining the world domain coordinates of the still objects. A configuration and operation of the image processing device according to an embodiment will be described in detail with reference to FIGS. 4 and 5.

The image processing device may output the world domain coordinates determined in operation S230 to correspond to the objects. The image processing device may explicitly or implicitly output the world domain coordinates of the objects to correspond to the objects. 'Explicitly outputting the world domain coordinates of the objects' may include, for example, displaying the world domain coordinates of the objects on a screen (or a map) to correspond to the objects and/or outputting the world domain coordinates of the objects as audio. Alternatively, 'implicitly outputting the world domain coordinates of the objects' may include, for example, controlling a vehicle by using the world domain coordinates of the objects, determining a position of the vehicle, or setting or changing a route.

According to an embodiment, the image processing device may perform scaling normalization on the image domain coordinates of the objects in the driving image based on the information on the vanishing line in the driving image. A method, performed by the image processing device, of performing the scaling normalization will be described in detail with reference to FIGS. 6 and 7.

Alternatively, according to an embodiment, the image processing device may track the image domain coordinates of the objects over the lapse of time. The image processing device may convert a type of the image domain coordinates of the objects into a floating point by filtering the image domain coordinates of the objects, which are tracked over the lapse of time. A method, performed by the image processing device, of converting the type of the image domain coordinates into the floating point will be described in detail with reference to FIG. 8.

According to an embodiment, the image processing device determines whether the objects detected in operation S210 are either the dynamic objects with mobility or the still objects without mobility, and may perform different operations in accordance with the determination result. An embodiment in which the image processing device distinguishes the dynamic objects from the still objects and detects the dynamic objects and the still objects will be described in detail with reference to FIG. 9.

Figure 3A:
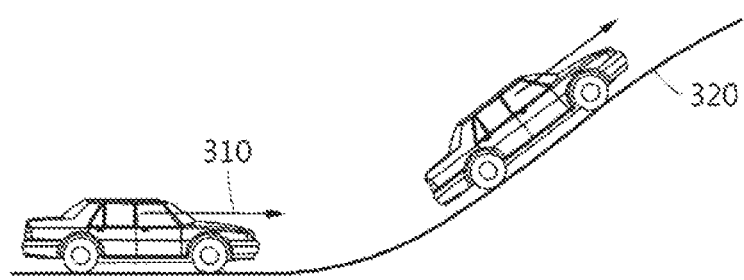
FIG. 3A is a view illustrating information on a difference in altitude according to an embodiment of the disclosure.

FIG. 3A is a view illustrating information on a difference in altitude according to an embodiment of the disclosure.

Referring to FIG. 3A, vehicle pitch information 310 and vanishing line information 320 are illustrated.

The vehicle pitch information 310 may correspond to information representing a slope or altitude of a vehicle based on the ground. The vehicle pitch information 310 may be measured by, for example, an inertial measurement unit (IMU) sensor or a gyro sensor. The vehicle pitch information 310 may be represented as 'p'.

The vanishing line information 320 may represent an altitude of a vanishing line of objects in front of the driving image or a vanishing point of an altitude at which the objects in front of the driving image converge. The vanishing line information 320 may include a position (for example, a y-coordinate of the vanishing point) of the vanishing point in the driving image. The vanishing line information 320 may be obtained from the driving image captured by the capturing device such as a camera.

The image processing device may obtain the vanishing line information 320 by recognizing an image in the driving image. The vanishing line information 320 may be represented as 'vl'.

Figure 3B:
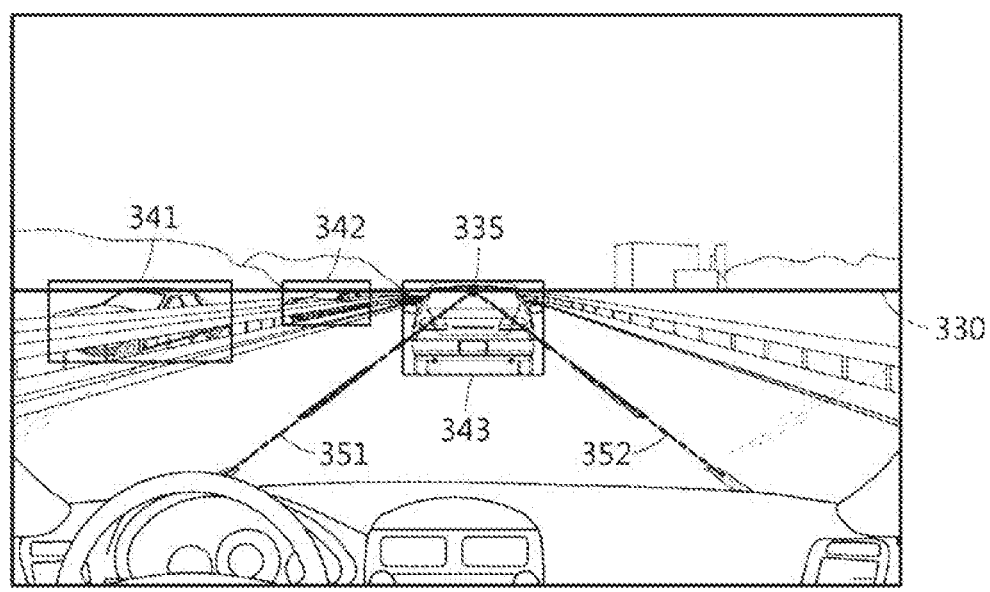
FIG. 3B is a view illustrating a method of obtaining information on a vanishing line, according to an embodiment of the disclosure.

FIG. 3B is a view illustrating a method of obtaining information on a vanishing line, according to an embodiment of the disclosure.

According to an embodiment, the image processing device may determine the vanishing line based on the highest point of a drivable road. For example, referring to FIG. 3B, the image processing device extracts regions 341, 342, and 343 of the drivable road based on image processing such as deep training and may determine the y-coordinate of a vanishing line 330 based on the highest point of the extracted regions of the drivable road. When the y-coordinate increases from an upper end of the image toward a lower end of the image, the highest point of the extracted regions may be a pixel with the smallest y-coordinate among pixels included in the extracted regions. In addition, the regions of the drivable road may be extracted based on a neighboring vehicle.

According to an embodiment, the image processing device extracts a plurality of lanes and may determine a point at which extended lines of the plurality of lanes meet as the vanishing point. For example, referring to FIG. 3B, the image processing device extracts two lanes 351 and 352 based on the image processing such as the deep training, extends the two lanes 351 and 352, and may determine a vanishing point 335. The image processing device may determine a y-coordinate of the determined vanishing point 335 as a y-coordinate of a vanishing line 330.

Figure 4:
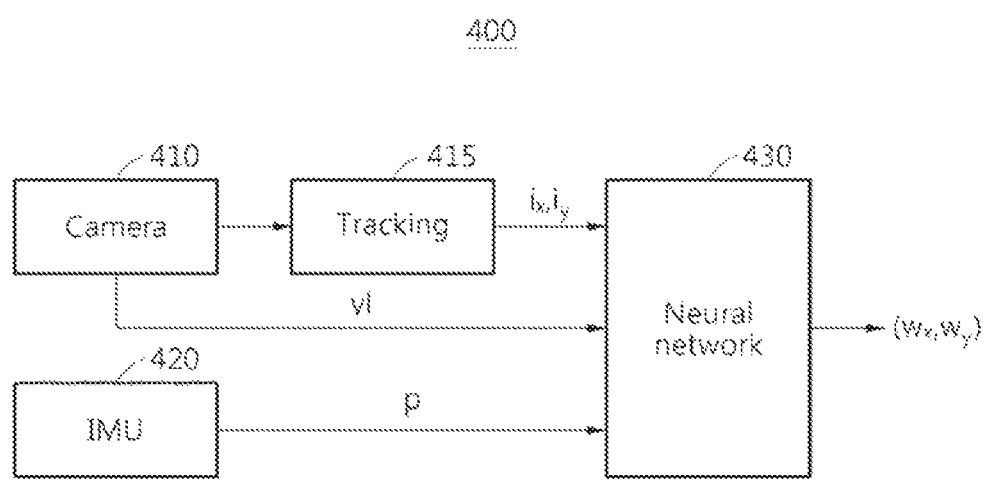
FIG. 4 is a view illustrating a configuration of an image processing device according to an embodiment of the disclosure.
Figure 5:
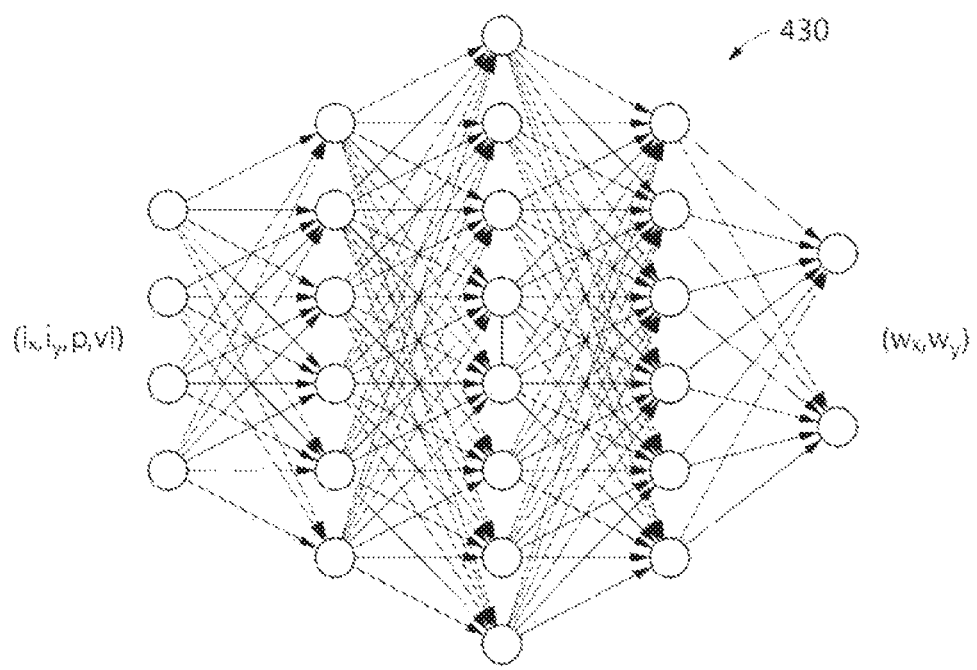
FIG. 5 is a view illustrating a structure of a neural network according to an embodiment of the disclosure.

FIG. 4 is a view illustrating a configuration of an image processing device 400 according to an embodiment of the disclosure. FIG. 5 is a view illustrating a structure of a neural network according to an embodiment of the disclosure.

Referring to FIGS. 4 and 5, the image processing device 400 according to the embodiment may include a camera sensor 410, an IMU sensor 420, and a neural network 430.

The image processing device 400 may detect objects from a driving image of a vehicle captured by the camera sensor 410. The image processing device 400 tracks the detected objects in operation 415 and may input point coordinates ($i_x$, $i_y$) of an image domain of the objects to the neural network 430. In addition, the image processing device 400 obtains vanishing line information vl in the driving image of the vehicle captured by the camera sensor 410 and may input the obtained vanishing line information to the neural network 430. The image processing device 400 may input pitch information p of a vehicle sensed by the IMU sensor 420 to the neural network 430.

The neural network 430 receives the point coordinates ($i_x$, $i_y$) of the image domain, the pitch information p of a current vehicle, and the vanishing line information vl, estimates world domain coordinates of the objects based on the input information items, and may output the world domain coordinates ($W_x$, $W_y$) corresponding to the point coordinates ($i_x$, $i_y$) of the image domain. The neural network 430 may include fully-connected layers as illustrated in FIG. 5.

According to an embodiment, the neural network 430 may be trained to distinguish dynamic objects from still objects and to estimate the world domain coordinates of the dynamic objects and the still objects, or the neural network 430 may be trained to estimate the world domain coordinates of the integrated objects without distinguishing the dynamic objects from the still objects.

The neural network 430 may determine information indicating an altitude difference between a vehicle and peripheral objects by the pitch information and the vanishing line information on the vehicle, and determine the world domain coordinates of the objects.

FIGS. 6A-B and 7A-B are views illustrating scaling normalization according to an embodiment of an embodiment of the disclosure.

The image processing device according to an embodiment may perform the scaling normalization on the image domain coordinates of the objects in the driving image.

As described above, the vanishing line information may include a position of a vanishing point in the driving image. The scaling normalization may be performed in an x axis direction and a y axis direction based on the position of the vanishing point (or a certain region including the vanishing point). During the scaling normalization in the x axis direction, an x coordinate of the vanishing point may be considered. During the scaling normalization in the y axis direction, a y coordinate of the vanishing point may be considered.

According to an embodiment, the image processing device may perform the scaling normalization based on a predetermined result (for example, an average vanishing point position) totally considering vanishing line information included in a plurality of frames. Alternatively, the image processing device obtains the vanishing line information every frame and may perform the scaling normalization based on information on a vanishing line by frame.

Hereinafter, a method of performing the scaling normalization in the x axis direction is described with reference to FIG. 6 and a method of performing the scaling normalization in the y axis direction is described with reference to FIG. 7. For example, the driving image illustrated in FIGS. 6A and 7A may have resolution of 1920 (width)×1200 (length).

Figure 6A:
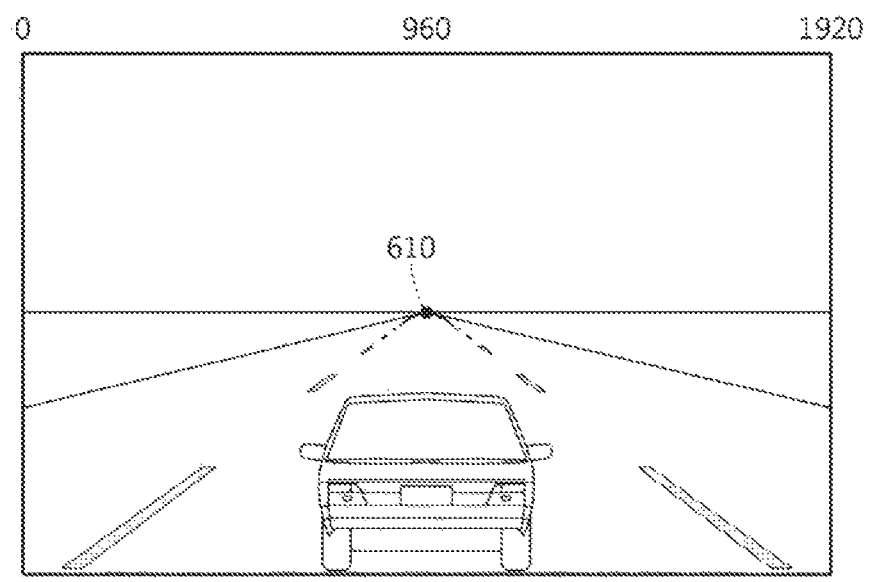
FIG. 6A is a view illustrating a driving image including a vanishing line.

In the driving image of FIG. 6A, in a long distance object positioned around an x coordinate of a vanishing point 610, while a distance between pixels is very large on an image domain, the distance between the pixels may be reduced as the distance from the x coordinate of the vanishing point 610 increases. Therefore, in an embodiment, the distance between the pixels on the image domain in the long distance object may be correctly represented by performing normalization in which a scaling ratio of a region close to the x coordinate of the vanishing point 610 is different from a scaling ratio of a region the further away from the x coordinate of the vanishing point 610.

In more detail, as illustrated in FIG. 6A, a vehicle is positioned at 960 pixels, which is about in the middle of the 1920 (the width) pixels in a horizontal axis of the driving image, and the x coordinate of the vanishing point 610 is positioned at 960 pixels. When the image domain coordinates are represented to linearly increase regardless of a distance between the long distance object and the vanishing point 610 like in a function 630 illustrated in FIG. 6B, the resolution by which the distance between the long distance object and the vanishing point 610 is represented may be reduced.

Figure 6B:
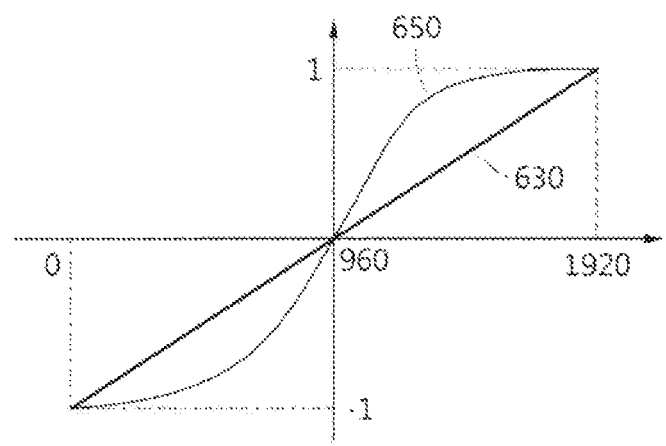
FIG. 6B is a view illustrating scaling normalization of X-axis according to an embodiment of the disclosure.

Therefore, according to an embodiment, like in a log scale function 650 illustrated in FIG. 6B, a slope value of a scaling factor may increase toward the vanishing point 610 and may be reduced as the distance from the vanishing point 610 increases; and accordingly, a region close to the vanishing point 610 and corresponding to a long distance may be represented in detail.

The image processing device according to an embodiment may improve the resolution by which the distance between the long distance object and the vanishing point 610 is represented by performing the scaling normalization on the x coordinate of the image domain of the long distance object in the driving image, for example, in the form of the log scale function 650 based on the vanishing line information in the driving image.

Figure 7A:
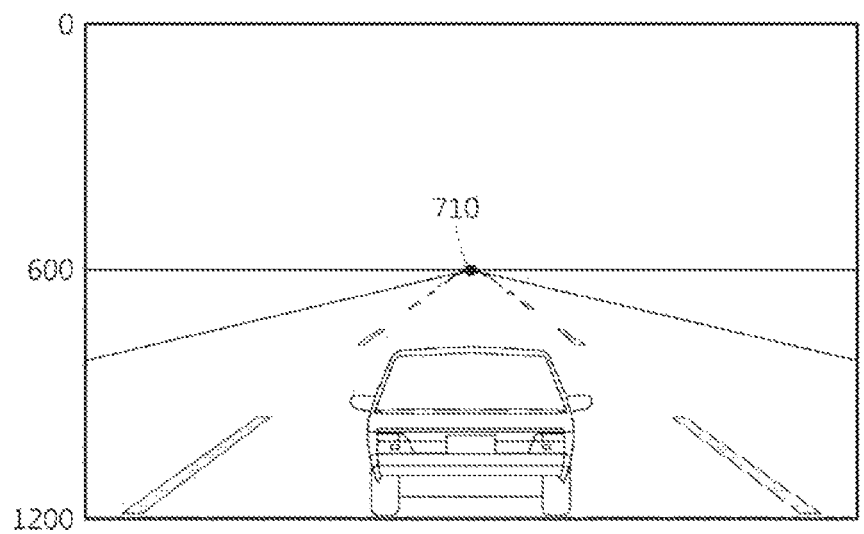
FIG. 7A is a view illustrating another driving image including a vanishing line.
Figure 7B:
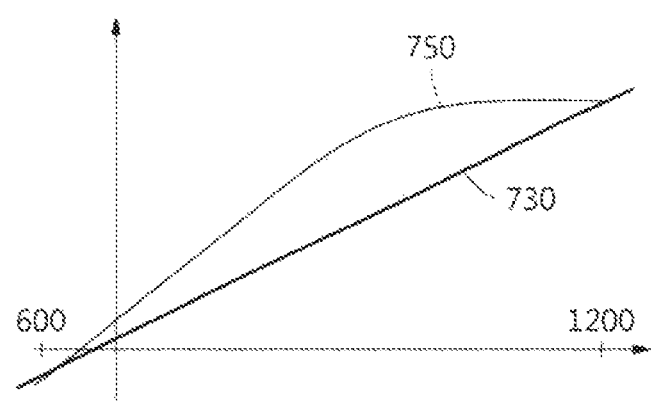
FIG. 7B is a view illustrating scaling normalization of Y-axis according to an embodiment of the disclosure.

In the driving image of FIG. 7A, based on 600 pixels as a y coordinate of a vanishing point 710, a region above the 600 pixels in the driving image of FIG. 7A corresponds to the sky. Because the sky will be present in the driving image regardless of a road or a lane that significantly affects driving of a vehicle, the sky may not be seriously considered when coordinates of an object are switched. In an embodiment, an operation amount may be reduced by performing the scaling normalization on image domain coordinates of an object included in a region (600 to 1,200 pixels) excluding a region corresponding to 0 to 600 pixels based on they coordinate of the vanishing point 710.

In the driving image of FIG. 7A, around the 600 pixels a y coordinate of the vanishing point 710, while a distance between pixels is very large on an image domain, the distance between the pixels may be reduced as the distance from the 600 pixels as the y coordinate of the vanishing point 710 increases. Without considering the above, when the image domain coordinates are represented to linearly increase regardless of the distance between the long distance object and the vanishing point 710, like in a function 730 illustrated in FIG. 7B, the resolution by which the distance between the long distance object and the vanishing point 710 is represented may be reduced.

Therefore, in an embodiment, the resolution by which the distance between the long distance object and the vanishing point 710 is represented may improve by performing normalization in which a scaling ratio of a region close to the y coordinate of the vanishing point 710 is different from a scaling ratio of a region as the distance from the y coordinate of the vanishing point 710 increases.

Figure 8:
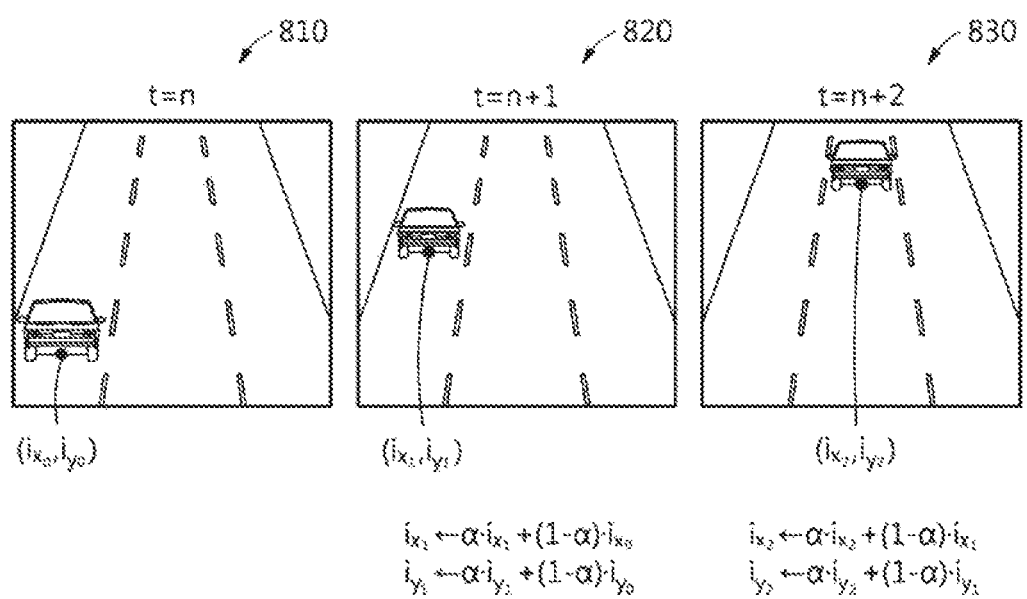
FIG. 8 is a view illustrating a conversion of a floating point according to an embodiment of the disclosure.

FIG. 8 is a view illustrating a conversion of a floating point according to an embodiment of the disclosure.

Referring to FIG. 8, drawings 810, 820, and 830 representing image domain coordinates of an object, which are tracked over the lapse of time, are illustrated.

For example, as illustrated in the drawing 810, image domain coordinates $(i_{x0}, i_{y0})$ of the object in the driving image captured at a point in time at which t=n may be in the form of an integer. When the image processing device normalizes the image domain coordinates, the image domain coordinates in the form of an integer may be discretely represented.

In an embodiment, a type of the image domain coordinates of the object may be converted into the floating point by tracking the image domain coordinates of the object over the lapse of time and filtering the tracked image domain coordinates of the object.

For example, the image processing device tracks image domain coordinates of an object and may filter the image domain coordinates $(i_{x1}, i_{y1})$ of the object, which are tracked at a point in time at which t=n+1, as illustrated in the drawing 820, such as $i_{x1} \leftarrow \alpha i_{x1} + (1-\alpha) x i_{x0}$, $i_{y1} \leftarrow \alpha i_{y1} + (1-\alpha) x i_{y0}$. In addition, the image processing device filters image domain coordinates $(i_{x2}, i_{y2})$ of an object, which are tracked at a point in time at which t=n+2, as illustrated in the drawing 830, such as $i_{x2} \leftarrow \alpha i_{x2} + (1-\alpha) x i_{x1}$, $i_{y2} \leftarrow \alpha i_{y2} + (1-\alpha) x i_{y1}$ and may convert the filtered image domain coordinates into floating point coordinates.

The image processing device according to an embodiment performs the scaling normalization on the image domain coordinates of the object, which are converted into the floating point, based on the vanishing line information in the driving image and may input the image domain coordinates, on which the scaling normalization is performed, to the neural network.

Figure 9:
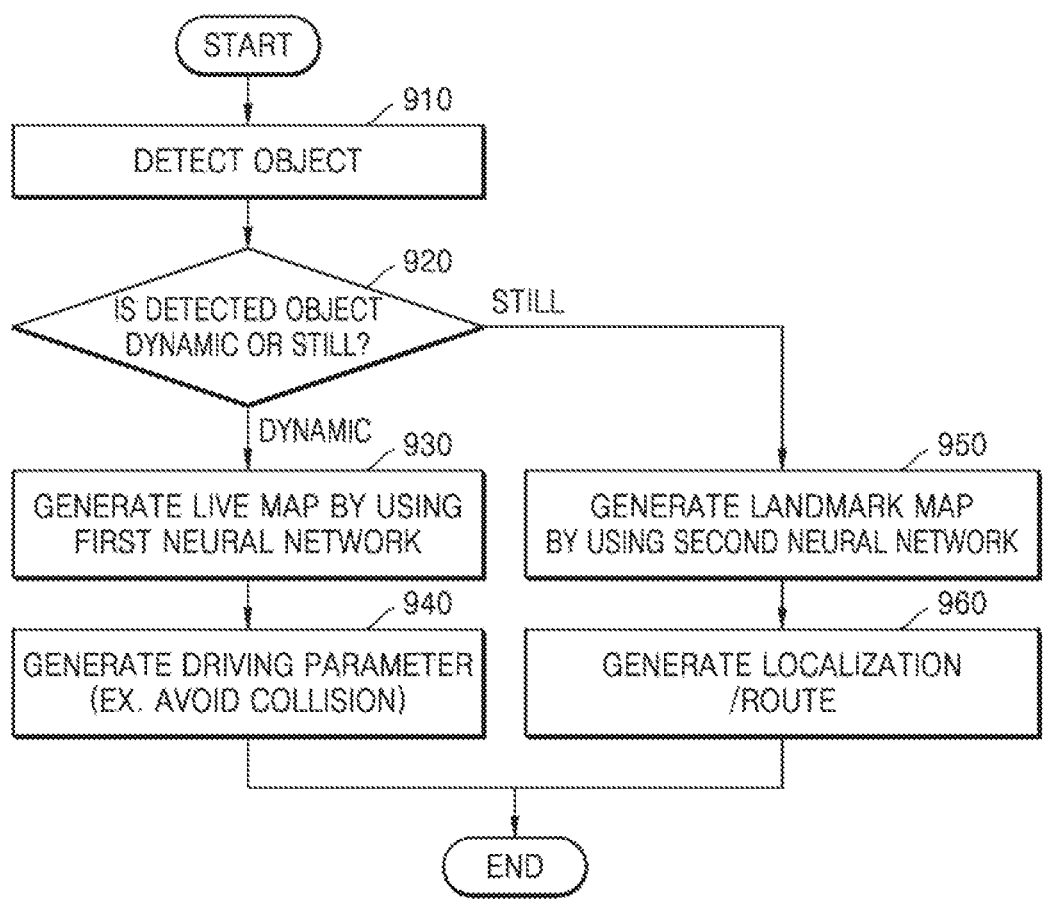
FIG. 9 is a flowchart illustrating an image processing method according to an embodiment of the disclosure.

FIG. 9 is a flowchart illustrating an image processing method according to an embodiment of the disclosure.

Referring to FIG. 9, the image processing device according to an embodiment may detect an object from a driving image of a vehicle in operation S910. The image processing device may determine whether the detected object is a dynamic object with mobility or a still object without mobility in operation S920. The image processing device may determine whether the detected object is the dynamic object or the still object by various machine training or various neural networks.

When it is determined in operation S920 that the object is a dynamic object, the image processing device may generate a live map corresponding to the dynamic object by using a first neural network, a result obtained by the first neural network converting image domain coordinates of the dynamic object into world domain coordinates, in operation S930.

The image processing device may generate a driving parameter of a vehicle by using the live or dynamically updated map in operation S940. The driving parameter may include a driving angle control parameter, an acceleration control parameter, a deceleration control parameter, and/or a turn signal lamp control parameter. The driving parameter generated by the image processing device may be used for preventing a vehicle from colliding with another vehicle.

When it is determined in operation S920 that the object is a still object, the image processing device may generate a landmark map corresponding to the still object by using a second neural network, a result obtained by the second neural network converting image domain coordinates of the dynamic object into world domain coordinates, in operation S950.

The image processing device may determine at least one of a localization and global path of the vehicle by using the landmark map in operation S960.

Hereinafter, a method, performed by the image processing device, of training the neural network will be described.

The image processing device according to an embodiment may train the neural network (NN) through remote distance data obtained by a homography operation. In the homography operation, by a uniform conversion relationship that establishes among projected corresponding points when a plane is projected to another plane, coordinates of the other plane are determined. In general, the homography operation has high reliability at a short range. Therefore, the image processing device may use point coordinates of the 2D image domain matched at a short range on a 3D world domain as initial training data.

Then, the image processing device may train the neural network while gradually increasing a collection distance of training data. The collection distance of the training data is gradually increased to prevent the image domain coordinates of the 2D driving image (the 2D image domain) and the 3D world domain coordinates from being erroneously matched.

When the training data is accumulated, the image processing device according to an embodiment may correctly collect the training data by providing an identifier (ID) to the dynamic object and/or the still object on the image domain of the 2D driving image, collecting sequential data, and matching the collected data with data collected by a distant sensor.

The image processing device according to an embodiment may also perform auto-calibration of converting the 2D image domain coordinates into the 3D world domain coordinates reflecting that a position or pose of the camera sensor or the distant sensor is twisted by accumulating the training data in real time and training the neural network by using the accumulated training data.

Figure 10:
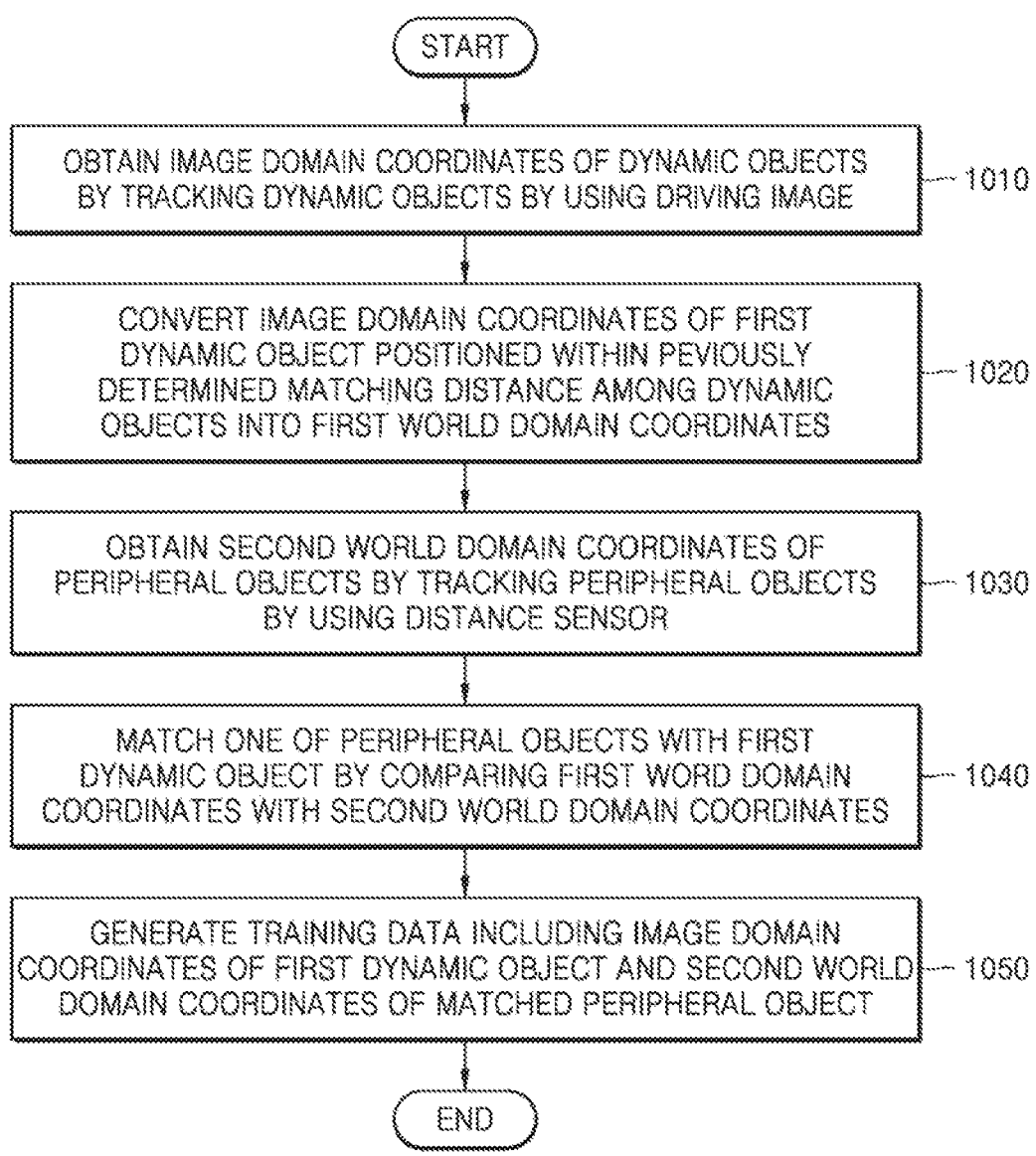
FIG. 10 is a flowchart illustrating a method of generating training data based on coordinates of dynamic objects in a driving image, according to an embodiment of the disclosure.

FIG. 10 is a flowchart illustrating a method of generating training data based on coordinates of dynamic objects in a driving image, according to an embodiment of an embodiment of the disclosure.

Referring to FIG. 10, a training data generating device (hereinafter, referred to as 'a generating device') according to an embodiment obtains the image domain coordinates of the dynamic objects by tracking the dynamic objects by analyzing the driving image in operation S1010. An example of a configuration of the training data generating device according to an embodiment will be described in detail with reference to FIG. 11.

According to an embodiment, the training data generating device may track the image domain coordinates of the dynamic objects over the lapse of time. The training data generating device may convert a type of the image domain coordinates of the dynamic objects into the floating point by filtering the tracked image domain coordinates of the dynamic objects. Alternatively, the training data generating device may perform the scaling normalization on the image domain coordinates of the dynamic objects in the driving image based on the vanishing line information in the driving image.

The training data generating device converts image domain coordinates of a first dynamic object positioned within a predetermined matching distance among the dynamic objects into first world domain coordinates in operation S1020. In operation S1020, the training data generating device may convert the image domain coordinates of the first dynamic object into the first world domain coordinates by the homography operation. The matching distance may be, for example, 15 m or 30 m. The training data generating device may provide a first ID to the first dynamic object.

The training data generating device obtains second world domain coordinates of peripheral objects by tracking the peripheral objects by using the distance sensor in operation S1030. The distance sensor maybe, for example, a Lidar sensor or a radar sensor. At this time, the training data generating device may provide second IDs to the peripheral objects.

The training data generating device matches one of the peripheral objects with the first dynamic object by comparing the first world domain coordinates with the second world domain coordinates in operation S1040. The training data generating device compares and matches a second ID provided to one of the peripheral objects with the first ID provided to the first dynamic object.

The training data generating device generates the training data including the image domain coordinates of the first dynamic object and the second world domain coordinates of the matched peripheral objects in operation S1050.

A method, performed by the training data generating device according to an embodiment, of generating the training data will be described in detail with reference to FIGS. 12 and 13.

Figure 11:
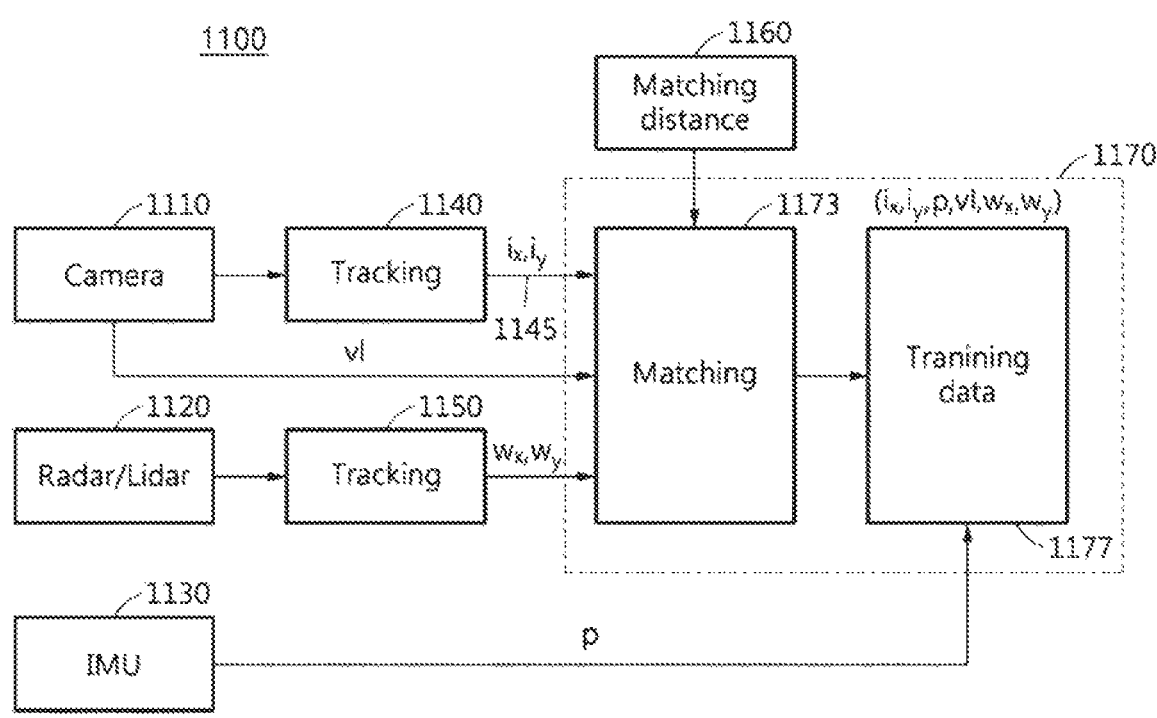
FIG. 11 is a configuration diagram of a training data generating device for dynamic objects according to an embodiment of the disclosure.

FIG. 11 is a configuration diagram of a training data generating device 1100 for dynamic objects according to an embodiment of the disclosure.

Referring to FIG. 11, the training data generating device 1100 according to an embodiment may include a camera sensor 1110, a distance sensor 1120, an IMU sensor 1130, and a processor 1170.

The training data generating device 1100 may detect dynamic objects from a driving image of a vehicle captured by the camera sensor 1110. The training data generating device 1100 may obtain the image domain coordinates of the dynamic objects by tracking 1140 the dynamic objects by using the driving image. The image domain coordinates may be in the form of $(i_x, i_y)$. The training data generating device 1100 may obtain vanishing point information vl from the driving image captured by the camera sensor 1110.

The training data generating device 1100 may convert 1145 the image domain coordinates $(i_x, i_y)$ of the first dynamic object positioned within a predetermined matching distance 1160 among the dynamic objects into the first world domain coordinates. As described in detail hereinafter, the training data generating device 1100 may convert the image domain coordinates $(i_x, i_y)$ of the first dynamic object position within the predetermined matching distance 1160 among the dynamic objects into the first world domain coordinates by the homography operation. After the initial training of the neural network is completed, the training data generating device 1100 may increase the matching distance 1160 by using the previously trained neural network instead of the homography operation for converting the image domain coordinates.

At this time, the training data generating device 1100 may provide the ID (for example, the first ID) to the first dynamic object.

In addition, the training data generating device 1100 may obtain the second world domain coordinates of the peripheral objects by tracking 1150 the peripheral objects of the vehicle by using the distance sensor 1120. The second world domain coordinates may be in the form of $(W_x, W_y)$. At this time, the distance sensor 1120 may output distances and angles between the vehicle and the peripheral objects. The training data generating device 1100 may provide the ID (for example, the second ID) to the tracked peripheral objects.

The training data generating device 1100 may generate training data 1177 by comparing the first world domain coordinates of the first dynamic object with the second world domain coordinates of the peripheral objects and matching 1173 the first world domain coordinates of the first dynamic object with the second world domain coordinates of the peripheral objects at a short range (for example, within the matching distance).

At this time, the training data generating device 1100 may accumulate the training data by obtaining the image domain coordinates ($i_x$, $i_y$) of the first dynamic object and the vanishing line information vl in the driving image from the camera sensor and obtaining the second world domain coordinates ($W_x$, $W_y$) of the peripheral objects from the distant sensor 1120. The training data generating device 1100 may obtain the pitch information p of the vehicle by the IMU sensor 1130 and may use the obtained pitch information p for generating the training data 1177.

After initially training the neural network by the training data generated by the homography operation performed on the image domain coordinates ($i_x$, $i_y$) of the first dynamic object, the training data generating device 1100 may generate the training data while gradually increasing the matching distance to a long distance. For example, in an embodiment, after the initial training, the previously trained neural network is used instead of the homography operation when the image domain coordinates are converted into the first world domain coordinates, and accordingly, the matching distance may be increased. A method, performed by the training data generating device 1100 according to an embodiment, of increasing the matching distance 1160 and generating the training data will be described in detail with reference to FIG. 12.

FIG. 12 is a view illustrating a method of generating training data for a dynamic object in a driving image, according to an embodiment of the disclosure.

Figures 12A, 12B:
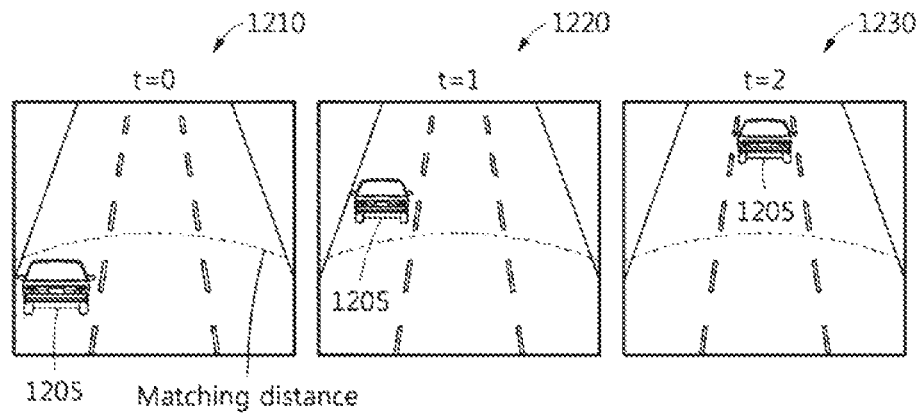
FIG. 12A are views illustrating driving images captured by a vehicle moving on a road.
FIG. 12B is a view illustrating a method of generating training data for a dynamic object in a driving image, according to an embodiment of the disclosure.

Referring to FIG. 12A, driving images 1210, 1220, and 1230, in which a vehicle 1205 that is moving on a road is captured, are illustrated. It is assumed that the driving image 1210 is captured at a point in time at which t=0 and the vehicle 1205 is positioned within the matching distance, and the driving image 1220 and the driving image 1230 are respectively captured at points in time at which t=1 and t=2 and the vehicle 1205 is positioned at distances greater than the matching distance.

In addition, referring to FIG. 12B, processes of generating the training data by gradually matching the image domain coordinates ($i_x$, $i_y$) of the dynamic object (for example, the vehicle 1205) obtained by the camera sensor with the second world domain coordinates ($W_x$, $W_y$) of the peripheral objects obtained by the distance sensor at the points in time t=n, t=n+1, and t=n+2 are illustrated.

For example, assuming that n=0, the training data generating device may convert the image domain coordinates ($i_{x0}$, $i_{y0}$) of the vehicle 1205 positioned within the matching distance into first world domain coordinates ($W_{x0}$, $W_{y0}$) by the homography operation at the point in time at which t=0. At this time, the training data generating device may provide an ID a to the vehicle 1205.

The training data generating device may obtain second world domain coordinates ($W_x^*$, $W_y^*$) of the peripheral objects obtained by the distance sensor at the point in time at which t=0. At this time, the training data generating device may provide IDs to the peripheral objects. For example, the training data generating device may provide an ID b to the vehicle 1205 among the peripheral objects obtained by the distance sensor.

The training data generating device compares the second world domain coordinates ($W_x^*$, $W_y^*$) of the peripheral objects with the first world domain coordinates ($W_{x0}$, $W_{y0}$) and may match one (for example, a vehicle as a peripheral object having second world domain coordinates ($W_{x0}^*$, $W_{y0}^*$)) closest to the first world domain coordinates ($W_{x0}$, $W_{y0}$) with the vehicle 1205. By performing the matching, the training data generating device determines that the dynamic object with ID=a tracked by the camera sensor, is the same as the peripheral object with ID=b tracked by the distance sensor and may generate the training data ($i_{x0}$, $i_{y0}$, $W_{x0}^*$, $W_{y0}^*$).

At this time, the matching performed at the point in time at which t=0 within the matching distance may be also maintained as ID=a=b at the points in time at which t=1 and t=2 and the vehicle 1205 is positioned within a distance greater than the matching distance. The training data generating device may generate training data ($i_{x1}$, $i_{y1}$, $W_{x1}^*$, $W_{y1}^*$) by using the second world domain coordinates ($W_{x0}^*$, $W_{y0}^*$) and first world domain coordinates ($W_{x1}$, $W_{y1}$) of the peripheral object with ID=b tracked by the distance sensor at the point in time at which t=1. The training data generating device may generate training data ($i_{x2}$, $i_{y2}$, $W_{x2}^*$, $W_{y2}^*$) at the point in time at which t=2 by the same method as at the point in time at which t=1.

Although not shown in the drawing, according to an embodiment, the training data generating device may store an object tracking history of the camera sensor and an object tracking history of the distance sensor. In this case, training data at a point in time before the matching is performed may be additionally generated by using the object tracking histories after the matching is performed.

FIG. 13 is a view illustrating a method of accumulatively generating training data, according to an embodiment of the disclosure.

Referring to FIG. 13, training data items accumulatively generated by the training data generating device according to an embodiment using different converters in accordance with the matching distance are illustrated.

The training data generating device according to an embodiment converts image domain coordinates of a first dynamic object positioned within the first matching distance (for example, 12 m) among the dynamic objects tracked by the driving image into first world domain coordinates by a homography operator and may generate training data 0 as initial training data based on the first world domain coordinates. Then, after training the neural network by training data 0, the training data generating device may accumulatively generate training data items 1 and 2 while increasing the matching distance as the number of repetitions gradually increases (for example by once and twice) and converting the image domain coordinates of the first dynamic object by the neural network. As described with reference to FIG. 12, after the matching is performed within the matching distance, the training data may be generated although deviating from the matching distance. Therefore, the neural network is trained to be converted at a greater matching distance than the first matching distance and a degree of matching correctness at a long range may gradually increase as iterations are performed.

Figure 14:
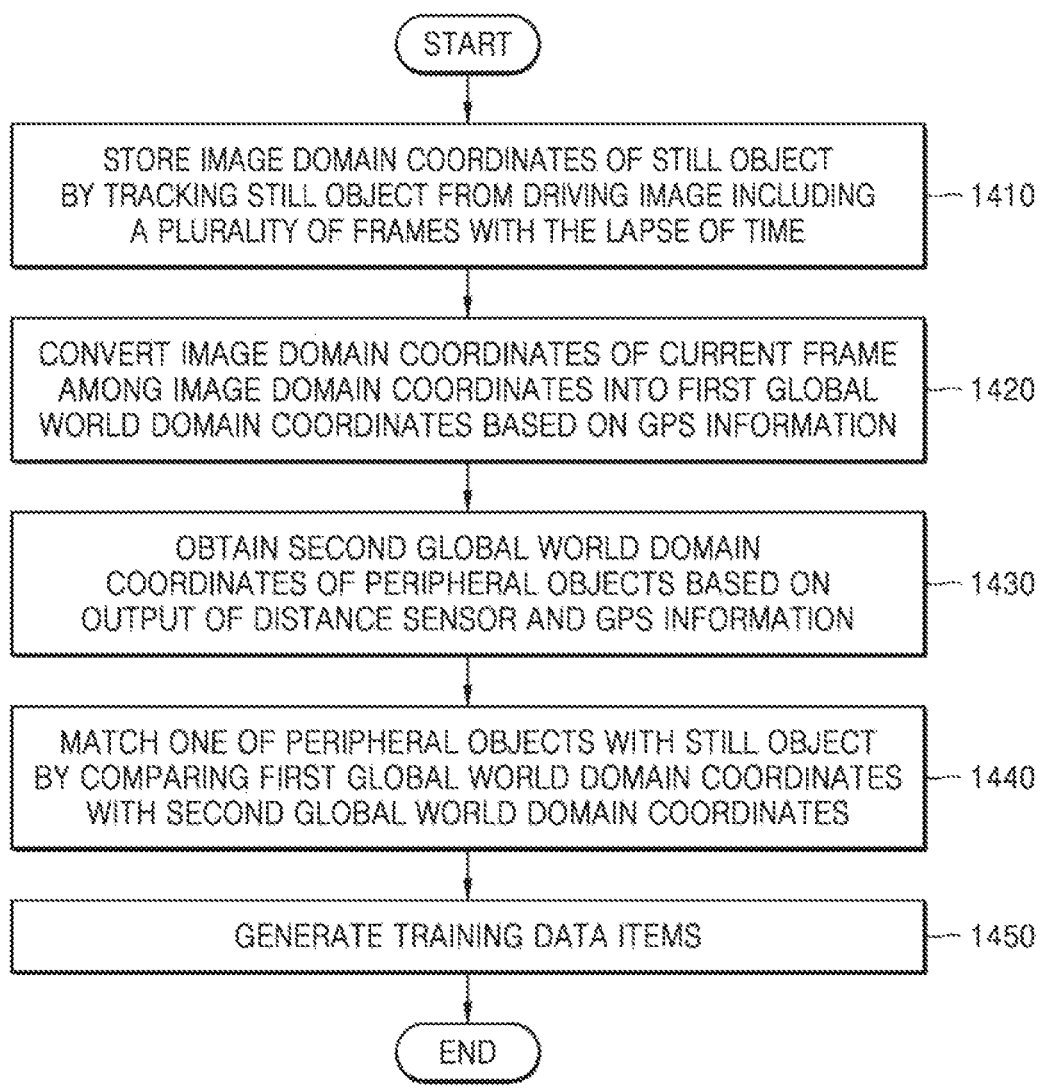
FIG. 14 is a flowchart illustrating a method of generating training data based on coordinates of a still object in a driving image, according to an embodiment of the disclosure.

FIG. 14 is a flowchart illustrating a method of generating training data based on coordinates of a still object in a driving image, according to an embodiment of the disclosure. Referring to FIG. 14, the training data generating device (or a processor of the training data generating device) according to an embodiment stores image domain coordinates of a still object by tracking the still object from the driving image including a plurality of frames over the lapse of time in operation S1410. At this time, the training data generating device may provide a first ID to the tracked still object. According to an embodiment, in operation S1410, the training data generating device may track the image domain coordinates of the still object over the lapse of time. The training data generating device may convert a type of the image domain coordinates of the still object into the floating point by filtering the image domain coordinates of the tracked still object. In addition, the training data generating device may perform the scaling normalization on the image domain coordinates of the still object in the driving image based on the vanishing line information in the driving image.

The training data generating device converts image domain coordinates of a current frame among the image domain coordinates into first global world domain coordinates based on global positioning system (GPS) information in operation S1420.

The training data generating device obtains second global world domain coordinates of peripheral objects based on an output of the distance sensor and the GPS information in operation S1430. At this time, the training data generating device may provide second IDs to the peripheral objects. In addition, the training data generating device may accumulatively store the output of the distance sensor and the GPS information.

The training data generating device matches one of the peripheral objects with the still object by comparing the first global world domain coordinates with the second global world domain coordinates in operation S1440. The training data generating device may match the second ID provided to one of the peripheral objects with the first ID provided to the still object.

The training data generating device generates the training data in operation S1450. At this time, each of the training data items may include the second global world domain coordinates of a peripheral object matched with one of the image domain coordinates stored in operation S1410.

Figure 15:
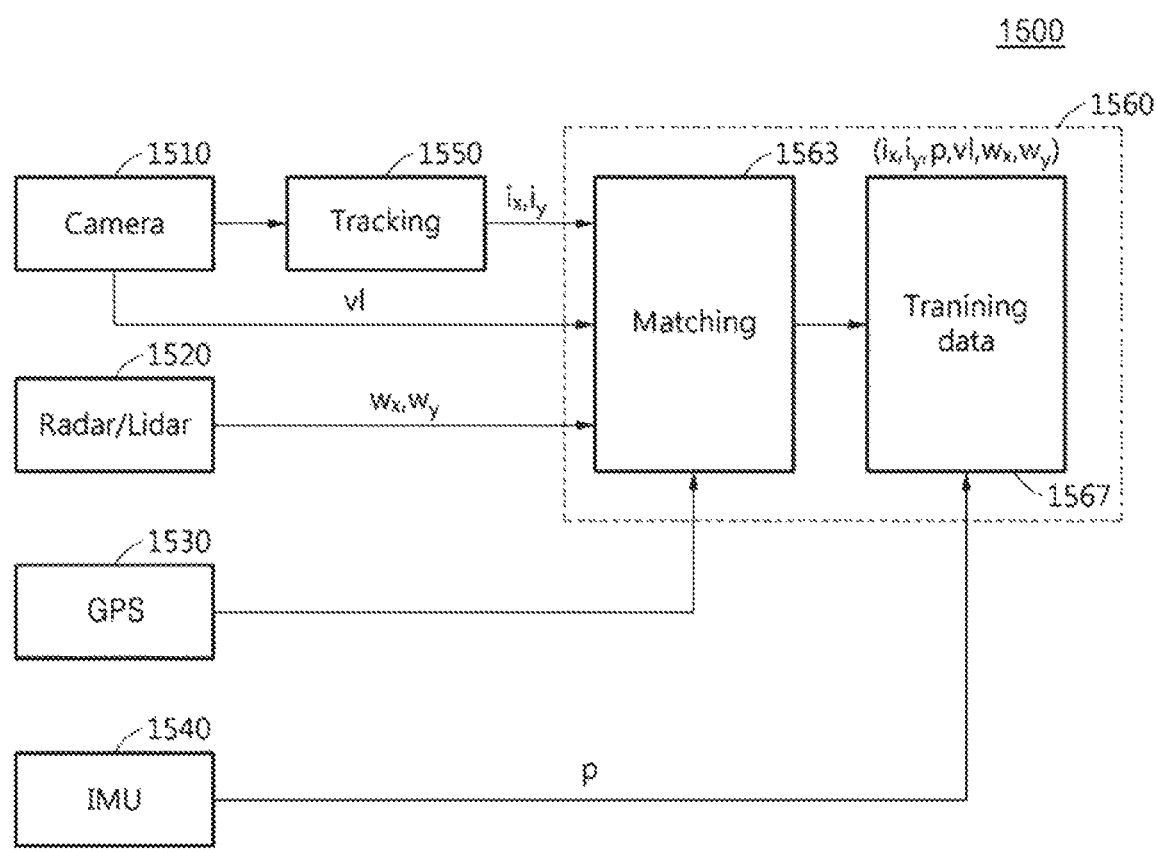
FIG. 15 is a configuration diagram of a training data generating device for still objects according to an embodiment of the disclosure.

FIG. 15 is a configuration diagram of a training data generating device 1500 for still objects according to an embodiment of the disclosure.

Referring to FIG. 15, the training data generating device 1500 according to an embodiment may include a camera sensor 1510, a distance sensor 1520, a GPS sensor 1530, an IMU sensor 1540, and a processor 1560.

The training data generating device 1500 may capture a driving image including a plurality of frames over the lapse of time by the camera sensor 1510. The training data generating device 1500 tracks 1550 image domain coordinates of a still object from the driving image over the lapse of time and may store the tracked image domain coordinates. At this time, the training data generating device 1500 may provide the ID (for example, the first ID) to the still object.

The training data generating device 1500 may convert a type of the image domain coordinates of the still object into the floating point by filtering the tracked image domain coordinates of the still object. The training data generating device 1500 may perform the scaling normalization on the image domain coordinates of the still object converted into the floating point based on the vanishing line information in the driving image.

The training data generating device 1500 may obtain the vanishing point information vl from the driving image captured by the camera sensor 1510.

The training data generating device 1500 may convert image domain coordinates of a current frame among the image domain coordinates of the still object into the first global world domain coordinates based on the GPS information sensed by the GPS sensor 1530.

The training data generating device 1500 may obtain the second global world domain coordinates of the peripheral objects of the vehicle based on the output ($W_x$, $W_y$) of the distance sensor 1520 and the GPS information.

The training data generating device 1500 compares the first global world domain coordinates with the second global world domain coordinates and may match 1563 the second ID provided to one of the peripheral objects with the first ID provided to the still object. At this time, the training data generating device 1500 may match the second ID provided to one of the peripheral objects with the first ID provided to the still object.

The training data generating device 1500 may generate training data 1567 to include the second global world domain coordinates of the peripheral object matched with one of the previously stored image domain coordinates. The training data generating device 1500 obtains the pitch information p of the vehicle through the IMU sensor 1540 and may use the pitch information p for generating the training data 1567.

A method, performed by the training data generating device 1500 according to an embodiment, of generating the training data by tracking the image domain coordinates of the still object over the lapse of time will be described in detail with reference to FIG. 16.

Figure 16:
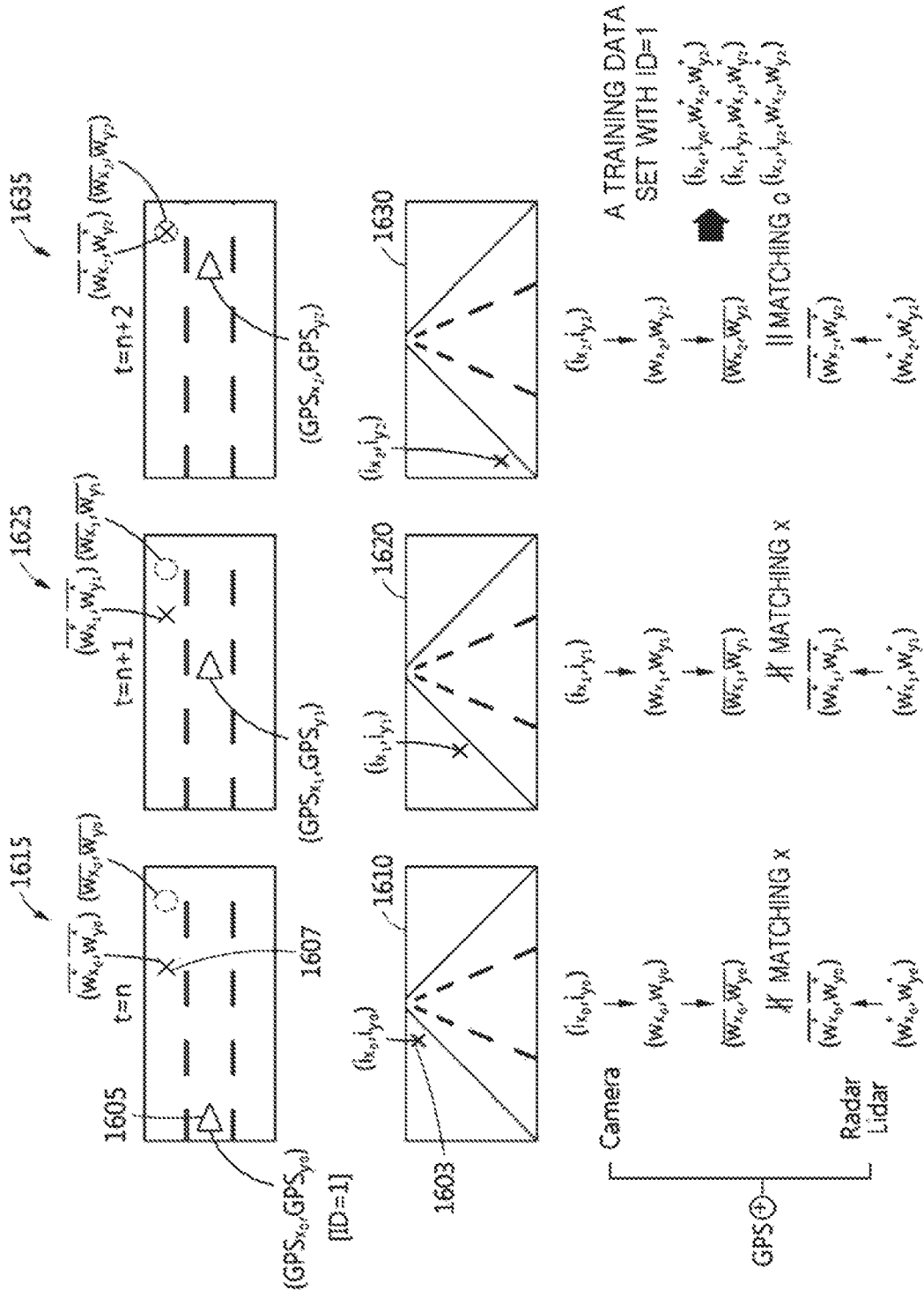
FIG. 16 is a view illustrating a method of generating training data on a still object in a driving image, according to an embodiment of the disclosure.

FIG. 16 is a view illustrating a method of generating training data on a still object in a driving image, according to an embodiment of the disclosure.

Referring to FIG. 16, driving images 1610, 1620, and 1630 of a vehicle 1605 with over the lapse of time and drawings 1615, 1625, and 1635 illustrating GPS information on the vehicle 1605 and a peripheral object 1607 to correspond to the driving images 1610, 1620, and 1630 are illustrated. It is assumed that a still object 1603 included in the driving images 1610, 1620, and 1630 and the peripheral object 1607 illustrated in the drawings 1615, 1625, and 1635 are the same object (for example, a street lamp). In addition, it is assumed that the driving image 1610 is captured at a point in time at which t=n and the driving image 1620 and the driving image 1630 are respectively captured at a point in time at which t=n+1 and at a point in time at which t=n+2.

The training data generating device according to an embodiment may store image domain coordinates ($i_x$, $i_y$) of the still object 1603 by tracking the still object 1603 from the driving images 1610, 1620, and 1630 over the lapse of time. The training data generating device may accumulatively store the output ($W_x^*$, $W_y^*$) of the distance sensor (for example, the radar/Lidar sensor) and the GPS information ($GPS_x$, $GPS_y$) over the lapse of time.

Because the still object 1603 does not have mobility, a position thereof is fixed. However, when the vehicle 1605 is remote from the still object 1603, a conversion of the image domain coordinates is incorrect and accordingly, matching is not performed. Therefore, after the training data generating device accumulatively stores the coordinates of the still object 1603 captured in accordance with the movement of the vehicle 1605, when the vehicle 1605 is close enough to the peripheral object 1607 corresponding to the still object 1603 and accordingly, matching is performed, training data on the coordinates of the accumulatively captured still object 1603 may be generated.

In more detail, the training data generating device may obtain the image domain coordinates ($i_{x0}$, $i_{y0}$) of the still object 1603 in the driving image 1630 at the point in time at which t=n obtained by the camera sensor and may store the obtained image domain coordinates ($i_{x0}$, $i_{y0}$). The training data generating device may provide an ID=1 to the still object 1603.

The training data generating device may convert the image domain coordinates ($i_{x0}$, $i_{y0}$) of the driving image 1630 into the first world domain coordinates ($W_{x0}$, $W_{y0}$) at the point in time at which t=n. The training data generating device may convert the first world domain coordinates ($W_{x0}$, $W_{y0}$) into first global world domain coordinates ($\overline{W_{x0}}$, $\overline{W_{y0}}$) based on GPS information ($GPS_{x0}$, $GPS_{y0}$) obtained by the GPS sensor.

In addition, the training data generating device may obtain second global world domain coordinates ($\overline{W_{x0}}^*$, $\overline{W_{y0}}^*$) of the peripheral object 1607 based on the output ($W_{x0}^*$, $W_{y0}^*$) of the distance sensor and the GPS information ($GPS_{x0}$, $GPS_{y0}$) at the point in time at which t=n.

The training data generating device may convert the image domain coordinates ($i_{x1}$, $i_{y1}$) and ($i_{x2}$, $i_{y2}$) of the driving images 1620 and 1630 into first global world domain coordinates ($\overline{W_{x1}}$, $\overline{W_{y1}}$) and ($\overline{W_{x2}}$, $\overline{W_{y2}}$) at the point in time at which t=n+1 and at the point in time at which t=n+2 in the same method at the point in time at which t=n.

In addition, the training data generating device may obtain second global world domain coordinates (($\overline{W_{x1}}^*$, $\overline{W_{y1}}^*$), ($\overline{W_{x2}}^*$, $\overline{W_{y2}}^*$)) of the still object 1607 based on an output (($W_{x1}^*$, $W_{y1}^*$), ($W_{x2}^*$, $W_{y2}^*$)) of the distance sensor and GPS information (($GPS_{x1}$, $GPS_{y1}$), ($GPS_{x2}$, $GPS_{y2}$)) like in the drawings 1625 and 1635 at the point in time at which t=n+1 and at the point in time at which t=n+2 in the same method at the point in time at which t=n. The training data generating device may accumulatively store the image domain coordinates that is an output of the camera sensor, outputs of the distance sensor, the GPS information, and the second global world domain coordinates of the still object 1607.

In the drawing 1615 corresponding to the point in time at which t=n, a difference (an error) is generated between the first global world domain coordinates ($\overline{W_{x0}}$, $\overline{W_{y0}}$) of the still object 1603 obtained by the camera sensor and the second global world domain coordinates ($\overline{W_{x0}}^*$, $\overline{W_{y0}}^*$) of the peripheral object 1607 obtained by the distance sensor. The difference (the error) is reduced as a distance between the vehicle 1605 and the peripheral object 1607 is gradually reduced over the lapse of time and may be removed or substantially removed such that the error is negligible at the point in time at which t=n+2.

The training data generating device compares the first global world domain coordinates to the second global world domain coordinates of the still object 1603 at the point in time at which t=n+2 and the vehicle 1605 is closest to the peripheral object 1607 (or the vehicle 1605 moves past the still object 1603) and may match the still object 1603 with the peripheral object 1607. The training data generating device may match the still object 1603 with the ID=1 with the peripheral object 1607. Through the matching, the training data generating device may generate a training data set (($i_{x0}$, $i_{y0}$, $W_{x2}^*$, $W_{y2}^*$), ($i_{x1}$, $i_{y1}$, $W_{x2}^*$, $W_{y2}^*$), ($i_{x2}$, $i_{y2}$, $W_{x2}^*$, $W_{y2}^*$)) for the still object 1603 with the ID=1 at a time.

Figure 17:
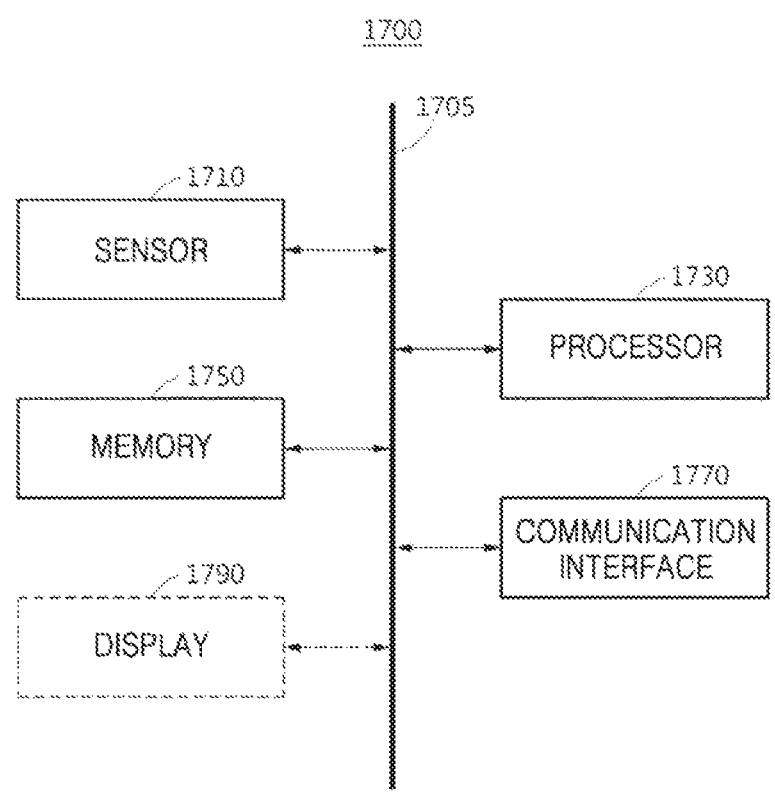
FIG. 17 is a block diagram of an image processing device according to an embodiment of the disclosure.

FIG. 17 is a block diagram of an image processing device 1700 according to an embodiment of an embodiment of the disclosure.

Referring to FIG. 17, the image processing device 1700 according to an embodiment includes a processor 1730. The image processing device 1700 may further include sensors 1710, a memory 1750, a communication interface 1770, and a display 1790. The sensors 1710, the processor 1730, the memory 1750, the communication interface 1770, and the display 1790 may communicate with each other through a communication bus 1705.

The sensors 1710 may include, for example, the camera sensor, an image sensor, a vision sensor, the IMU sensor, the gyro sensor, an acceleration sensor, the GPS sensor, a terrestrial magnetic sensor, the Lidar sensor, the radar sensor, and an altitude measurement sensor. However, an embodiment of the disclosure is not limited thereto. The camera sensor, the image sensor, and/or the vision sensor may be mounted in a vehicle and may capture a driving image of the vehicle. The IMU sensor, the gyro sensor, and/or the altitude measurement sensor may sense the pitch information of the vehicle. The Lidar sensor and/or the radar sensor may sense (local) world domain coordinates of an object. The GPS sensor may sense global world domain coordinates of the vehicle.

The processor 1730 may perform at least one method described above through FIGS. 1 to 16 or an algorithm corresponding to the at least one method. That is, the various blocks illustrated in the figures may be implemented as hardware or software under control of execution by the processor 1730. The processor 1730 may execute a program representative of the various blocks illustrated in the figures and may control the image processing device 1700. The program code executed by the processor 1730 may be stored in the memory 1750.

The processor 1730 may be formed of, for example, a central processing unit (CPU) or a graphics processing unit (GPU).

The memory 1750 may store information on a driving image and an altitude difference between the vehicle and the object. In addition, the memory 1750 may store image domain coordinates of the object tracked with the lapse of time. In addition, the memory 1750 may store a live map generated by the processor 1730 to correspond to the dynamic object and/or a landmark map generated to correspond to the still object.

The memory 1750 may store world domain coordinates of the object determined by the processor 1730.

World domain coordinates of the still object stored in the memory 1750 may be read from memory 1750 for rapidly grasping information that does not change such as a crosswalk, a sign, a lane, and surrounding terrain when the vehicle passes by the same area. Considering that the vehicle moves in the same route when the vehicle is used for a commute, by using the information previously stored in the memory 1750, it is possible to improve an image processing speed for determining the world domain coordinates of the still object and to reduce processing load. The memory 1750 may be a volatile memory or a non-volatile memory.

The communication interface 1770 may receive the driving image captured by an external source outside of the image processing device 1700, such as a traffic camera or a camera mounted to another vehicle or structure, or information of various sensors received from the outside of the image processing device 1700 and map information. According to an embodiment, the communication interface 1770 may transmit the world domain coordinates of the object determined by the processor 1730 to the outside of the image processing device 1700 or the display 1790.

The display 1790 may display the world domain coordinates of the object together with the driving image or may additionally display the world domain coordinates of the object. The display 1790 may display the world domain coordinates of the object as, for example, map information, a position of the object in a navigation image, or the world domain coordinates of the object. For example, when the image processing device 1700 is embedded in the vehicle, the display 1790 may be formed of a head up display (HUD) provided in the vehicle.

The embodiments of the disclosure may be implemented by a hardware component, a software component, and/or a combination of the hardware component and the software component. For example, the device, the method, and the components that are described in the embodiments may be implemented by using one or more common purpose computers or special purpose computers like a processor, a controller, an arithmetic logic unit (ALU), a digital signal processor, a microcomputer, a field programmable gate array (FPGA), a programmable logic unit (PLU), a microprocessor, or another certain device capable of executing and responding an instruction. The processing device may perform an operating system (OS) and one or more software applications performed on the OS. In addition, the processing device may access, store, manipulate, process, and generate data in response to execution of software. For convenience sake, it is illustrated that only one processing device is used. However, those skilled in the art may understand that the processing device may include a plurality of processing elements and/or a plurality types of processing elements. For example, the processing device may include a plurality of processors or a processor and a controller. In addition, another processing configuration such as a parallel processor is available.

The software may include a computer program, code, an instruction, or one or more combinations of the computer program, the code, and the instruction and may configure the processing device so as to operate as desired or independently or collectively instruct the processing device. The software and/or the data may be permanently or temporarily embodied in a certain type of machine, a component, a physical device, virtual equipment, a computer storage medium or device, or a transmitted signal wave in order to be interpreted by the processing device or to provide the instruction or the data to the processing device. The software is dispersed on a computer system connected by a network and may be stored or executed by a dispersed method. The software and the data may be stored in one or more computer-readable recoding media.

The method according to the embodiment may be implemented in the form of a program instruction that may be performed by various computer units and may be recorded in a computer-readable recording medium. The computer-readable recording medium may include a program instruction, a data file, and a data structure or a combination of the program instruction, the data file, and the data structure. The program instruction recorded in the computer-readable recording medium is specially designed configured for the embodiment or may be well known to software engineers. The computer-readable recording medium may be, for example, a magnetic medium such as a hard disc, a floppy disc, or a magnetic tape, an optical medium such as a compact disc read only memory (CD-ROM) or a digital versatile disc (DVD), a magneto-optical medium such as a floptical disc, or a hardware device specially configured to store and perform the program instruction such as a ROM, random access memory (RAM), or flash memory. The program instruction may include high-level language code that may be executed by a computer by using an interpreter as well as a machine language code created by a compiler. The hardware device may be configured to operate as one or more software modules in order to perform the operation of the embodiment and the reverse is available.

While embodiments of the disclosure have been particularly shown and described, it will be understood that various changes in form and details may be made therein without departing from the spirit and scope of the following claims.

What is claimed is:

1. An image processing method for controlling a vehicle on a road, the image processing method comprising:
   detecting an object within a driving image, captured by a capturing device mounted on the vehicle;
   obtaining an altitude difference between the vehicle and the object, the altitude difference comprising pitch information of the vehicle and vanishing line information in the driving image;
   determining world domain coordinates of the object by a neural network processing of image domain coordinates of the object in the driving image and the altitude difference; and
   controlling the vehicle on the road with respect to the object based on the world domain coordinates of the object,
   wherein the image processing method further comprises performing scaling normalization on the image domain coordinates of the object in the driving image according to a log function in which a slope value of a scaling factor increases toward a vanishing point in the driving image and is reduced as a distance from the vanishing point increases.

2. The image processing method of claim 1, further comprising:
   tracking the image domain coordinates of the object over lapse of time; and
   filtering the image domain coordinates of the object and converting a type of the image domain coordinates of the object into a floating point.

3. The image processing method of claim 1, wherein the object is either a dynamic object with mobility or a still object without mobility, and
   wherein a neural network that performs the neural network processing comprises:
   a first neural network for estimating world domain coordinates of the dynamic object; and
   a second neural network for estimating world domain coordinates of the still object.

4. The image processing method of claim 1, wherein the object is a dynamic object with mobility, and
   wherein the image processing method further comprises:
   generating a live map corresponding to the dynamic object by using a result of converting image domain coordinates of the dynamic object into world domain coordinates; and
   generating a driving parameter of the vehicle for controlling the vehicle on the road with respect to the dynamic object by using the live map.

5. The image processing method of claim 1, wherein the object is a still object without mobility, and
   wherein the image processing method further comprises:
   generating a landmark map corresponding to the still object by using a result of converting image domain coordinates of the still object into world domain coordinates; and
   determining at least one of a position and a route of the vehicle for controlling the vehicle on the road with respect to the still object by using the landmark map.

6. The image processing method of claim 1, further comprising outputting the world domain coordinates of the object.

7. The image processing method of claim 1, further comprising obtaining the driving image captured by a camera mounted in the vehicle.

8. The image processing method of claim 1, wherein the scaling nominalization is first scaling nomination performed according to the log function in an X axis direction, and the scaling nominalization further comprises performing second scaling nominalization according to a non-linear function in a Y axis direction.

9. A training data generating method comprising:
obtaining two dimensional (2D) image domain coordinates of dynamic objects by tracking the dynamic objects within in a driving image;
converting 2D image domain coordinates of a first dynamic object among the dynamic objects into first world domain coordinates of the first dynamic object, wherein the first dynamic object is positioned within a predetermined matching distance from a vehicle;
obtaining second world domain coordinates of peripheral objects by tracking the peripheral objects by using a distance sensor;
matching one of the peripheral objects with the first dynamic object by comparing the first world domain coordinates and the second world domain coordinates; and
generating training data including the 2D image domain coordinates of the first dynamic object and the second world domain coordinates of the matched one of the peripheral objects,
wherein the training data generating method further comprises:
tracking the 2D image domain coordinates of the dynamic objects over lapse of time;
converting a type of the 2D image domain coordinates of the dynamic objects into a floating point by filtering the 2D tracked image domain coordinates of the dynamic objects; and
performing scaling normalization on the 2D image domain coordinates of the dynamic objects in the floating point based on vanishing line information in the driving image.

10. The training data generating method of claim 9, wherein the converting of the 2D image domain coordinates comprises converting initial 2D image domain coordinates of the first dynamic object into the first world domain coordinates by a homography operation.

11. The training data generating method of claim 9, further comprising:
associating a first identifier (ID) with the first dynamic object; and
associating second IDs with the peripheral objects,
wherein the matching of one of the peripheral objects with the first dynamic object comprises matching a second ID among the second IDs associated with one of the peripheral objects with the first ID associated with the first dynamic object.

12. The training data generating method of claim 9, wherein the dynamic objects comprise at least one of peripheral vehicles, pedestrians, and animals.

13. The training data generating method of claim 9, wherein the scaling nominalization comprises first scaling nominalization performed according to a log function in an X axis direction, and second scaling nominalization performed according to a non-linear function in a Y axis direction.

14. A training data generating method comprising:
storing two-dimensional (2D) image domain coordinates of a still object by tracking the still object from a driving image including a plurality of image frames over lapse of time;
converting 2D image domain coordinates of a current image frame among the 2D image domain coordinates into first global world domain coordinates based on global positioning system (GPS) information;
obtaining second global world domain coordinates of peripheral objects based on an output of a distance sensor and the GPS information;
matching one of the peripheral objects with the still object by comparing the first global world domain coordinates with the second global world domain coordinates; and
generating a plurality of training data, each training data of the plurality of training data includes one of the stored 2D image domain coordinates and the second global world domain coordinates of the matched one of the peripheral objects,
wherein the training data generating method further comprises performing scaling normalization on the 2D image domain coordinates of the still object in the driving image according to a log function in which a slope value of a scaling factor increases toward a vanishing point in the driving image and is reduced as a distance from the vanishing point increases.

15. The training data generating method of claim 14, further comprising:
associating a first ID with the still object; and
associating second IDs with the peripheral objects,
wherein the matching one of the peripheral objects with the still object comprises matching a second ID among the second IDs associated with one of the peripheral objects with the first ID associated with the still object.

16. The training data generating method of claim 14, wherein the still object comprises at least one of buildings, signs, traffic lights, a crosswalk, a stop line, and a driving line included in the driving image.

17. The training data generating method of claim 14, further comprising:
tracking the 2D image domain coordinates of the still object over lapse of time; and
converting a type of the 2D image domain coordinates of the still object into a floating point by filtering the tracked 2D image domain coordinates of the still object.

18. The training data generating method of claim 14, wherein the scaling nominalization is first scaling nomination performed according to the log function in an X axis direction, and
the scaling nominalization further comprises performing second scaling nominalization according to a non-linear function in a Y axis direction.

* * * * *